(12) United States Patent
Yoshida et al.

(10) Patent No.: US 10,915,040 B2
(45) Date of Patent: Feb. 9, 2021

(54) TONER CONTAINER WITH AN OPERATING STRUCTURE DISPOSED ON A FIRST SIDE, A SHUTTER DISPOSED ON A SECOND SIDE, AND A LOCK

(71) Applicant: Ricoh Company, Ltd., Tokyo (JP)

(72) Inventors: Tomofumi Yoshida, Osaka (JP); Kohta Sakaya, Hyogo (JP); Shinichi Arasawa, Hyogo (JP); Jin Sam Park, Seoul (KR); Goo Chul Jung, Seoul (KR); Yasunobu Ogata, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/726,937

(22) Filed: Dec. 26, 2019

(65) Prior Publication Data

US 2020/0133164 A1  Apr. 30, 2020

Related U.S. Application Data

(60) Continuation of application No. 15/929,128, filed on Apr. 30, 2019, now Pat. No. 10,564,572, which is a
(Continued)

(30) Foreign Application Priority Data

May 30, 2013 (JP) .................. 2013-114144
Jul. 5, 2013 (JP) .................. 2013-141524
Aug. 5, 2013 (JP) .................. 2013-162345

(51) Int. Cl.
*G03G 15/08* (2006.01)
*G03G 21/18* (2006.01)

(52) U.S. Cl.
CPC ..... *G03G 15/0886* (2013.01); *G03G 21/1821* (2013.01); *G03G 15/0875* (2013.01); *G03G 2215/067* (2013.01)

(58) Field of Classification Search
CPC .......... G03G 15/0886; G03G 15/0865; G03G 15/0868; G03G 15/0875; G03G 21/12;
(Continued)

(56) References Cited

U.S. PATENT DOCUMENTS 5,608,501 A  3/1997 Makino
7,062,205 B2  6/2006 Nagashiro
(Continued)

FOREIGN PATENT DOCUMENTS

CN  2461027  11/2001
CN  1773395 A  5/2006
(Continued)

OTHER PUBLICATIONS

Taiwanese Office Action dated Nov. 20, 2019 in Taiwanese Application No. 107147826.
(Continued)

*Primary Examiner* — Robert B Beatty
(74) *Attorney, Agent, or Firm* — Xsensus LLP

(57) ABSTRACT

A toner container is detachably attachable to a developing device. The developing device includes an inlet to be poured with a toner, an inlet shutter to move between a closed position, at which the inlet is closed, and an open position, at which the inlet is open, a biasing mechanism to bias the inlet shutter toward the closed position, an engaged structure provided in the inlet shutter, an engaging structure to engage with the engaged structure and to retain the inlet shutter at the open position against a biasing force of the biasing mechanism, and an engagement releasing structure provided in the inlet shutter and to release an engaging state between the engaged structure and the engaging structure. The toner container includes a contacting surface to contact with the engagement releasing structure and to make the engagement releasing structure release the engaging state.

16 Claims, 30 Drawing Sheets

Related U.S. Application Data continuation of application No. 15/971,631, filed on May 4, 2018, now Pat. No. 10,365,584, which is a continuation of application No. 15/490,034, filed on Apr. 18, 2017, now Pat. No. 10,025,227, which is a division of application No. 14/893,826, filed as application No. PCT/JP2014/065021 on May 30, 2014, now Pat. No. 9,690,231.

(58) Field of Classification Search
CPC ......... G03G 21/1821; G03G 2215/068; G03G 2215/0685; G03G 2215/0692; G03G 2215/067; G03G 2221/1853; G03G 2221/1869
USPC ............ 399/120, 258, 262, 359; 222/DIG. 1
See application file for complete search history.

(56) References Cited

U.S. PATENT DOCUMENTS

| | | | |
|---|---|---|---|
| 7,486,910 | B2 | 2/2009 | Kitozaki |
| 7,515,854 | B2 | 4/2009 | Kawai |
| 7,574,161 | B2 | 8/2009 | Ota |
| 7,639,968 | B2 | 12/2009 | Takagi |
| 7,676,186 | B2 | 3/2010 | Kimura |
| 7,738,817 | B2 | 6/2010 | Sasae et al. |
| 8,060,003 | B2 | 11/2011 | Yoshizawa |
| 8,335,455 | B2 | 12/2012 | Maeshima |
| 8,600,267 | B2 | 12/2013 | Sato |
| 8,655,236 | B2 | 2/2014 | Ushikubo |
| 8,918,029 | B2 | 12/2014 | Matsumoto |
| 8,948,659 | B2 | 2/2015 | Baker |
| 9,031,451 | B2 | 5/2015 | Rulon |
| 2004/0131391 | A1 | 7/2004 | Nagashiro |
| 2004/0141774 | A1 | 7/2004 | Hayashi et al. |
| 2006/0104663 | A1 | 5/2006 | Kitozaki |
| 2006/0171744 | A1 | 8/2006 | Ikeda et al. |
| 2007/0077099 | A1 | 4/2007 | Ota |
| 2007/0212118 | A1 | 9/2007 | Nagae et al. |
| 2007/0223965 | A1 | 9/2007 | Takagi |
| 2008/0095549 | A1 | 4/2008 | Yoshizawa |
| 2008/0181661 | A1 | 7/2008 | Mase et al. |
| 2008/0260421 | A1 | 10/2008 | Mase |
| 2008/0260422 | A1 | 10/2008 | Sasae et al. |
| 2009/0110452 | A1 | 4/2009 | Ogata |
| 2009/0115071 | A1 | 5/2009 | Karashima et al. |
| 2009/0126876 | A1 | 5/2009 | Karashima et al. |
| 2009/0154973 | A1 | 6/2009 | Shimizu et al. |
| 2009/0232547 | A1 | 9/2009 | Nagae et al. |
| 2010/0067957 | A1 | 3/2010 | Tazawa |
| 2010/0166460 | A1 | 7/2010 | Maeshima |
| 2010/0272474 | A1 | 10/2010 | Sato |
| 2011/0052255 | A1 | 3/2011 | Yoshida et al. |
| 2011/0052256 | A1 | 3/2011 | Arasawa |
| 2011/0052266 | A1 | 3/2011 | Yoon et al. |
| 2011/0222915 | A1 | 9/2011 | Furuhata |
| 2012/0027454 | A1 | 2/2012 | Itabashi et al. |
| 2012/0033982 | A1 | 2/2012 | Kubota |
| 2012/0114392 | A1 | 5/2012 | Ushikubo |
| 2012/0189345 | A1 | 7/2012 | Kim et al. |
| 2012/0219328 | A1 | 8/2012 | Oda |
| 2012/0321341 | A1 | 12/2012 | Hori et al. |
| 2013/0170865 | A1 | 7/2013 | Carter |
| 2013/0287447 | A1 | 10/2013 | Baker et al. |
| 2014/0050507 | A1 | 2/2014 | Hamada |
| 2014/0161491 | A1 | 6/2014 | Fukushima |
| 2015/0030355 | A1 | 1/2015 | Eto et al. |
| 2015/0346636 | A1 | 12/2015 | Fukushima |

FOREIGN PATENT DOCUMENTS

| | | |
|---|---|---|
| CN | 1773395 B | 5/2006 |
| EP | 0985981 | 3/2000 |
| EP | 1 211 570 A2 | 6/2002 |
| JP | 04-181967 | 6/1992 |
| JP | 06035321 A | 2/1994 |
| JP | 07-225514 | 8/1995 |
| JP | 08152784 A | 6/1996 |
| JP | 10020746 A | 1/1998 |
| JP | 3044997 B2 | 5/2000 |
| JP | 2002/328586 | 11/2002 |
| JP | 2004-205587 A | 7/2004 |
| JP | 2006/139069 | 6/2006 |
| JP | 2006-139110 | 6/2006 |
| JP | 2006-201813 | 8/2006 |
| JP | 2006-235592 | 9/2006 |
| JP | 2006-309147 | 11/2006 |
| JP | 2006-330151 | 12/2006 |
| JP | 2007-093737 A | 4/2007 |
| JP | 4084835 | 2/2008 |
| JP | 2008-083517 | 4/2008 |
| JP | 2008-216452 | 9/2008 |
| JP | 4459025 | 2/2010 |
| JP | 2010-128437 | 6/2010 |
| JP | 2010-170100 A | 8/2010 |
| JP | 2010256806 A | 11/2010 |
| JP | 4750403 B2 | 8/2011 |
| JP | 2012-037554 | 2/2012 |
| JP | 4899754 B2 | 3/2012 |
| JP | 2012-103418 | 5/2012 |
| JP | 2012-155064 A | 8/2012 |
| JP | 2013-160874 | 8/2013 |
| KR | 10-2011-0102128 | 9/2011 |
| RU | 2 367 016 C2 | 9/2009 |

OTHER PUBLICATIONS

Notice of Allowance dated Jul. 15, 2019 issued in corresponding Korean Patent Application No. 10-2019-7018906 with English Translation, 8 pages.

International Search Report dated Jul. 8, 2014 in PCT/JP2014/065021 filed May 30, 2014.

Korean Office Action dated Mar. 31, 2017 in Patent Application No. 10-2015-7036417 (with English Translation).

Combined Notice of Allowance and Search Report dated Mar. 17, 2016 in Taiwanese Patent Application No. 103119147 with partial English translation and English translation of category of cited documents.

Japanese Office Action dated May 15, 2017 in Japanese Patent Application No. 2013-162345.

Combined Office Action and Search Report dated Apr. 18, 2018 in Russian Patent Application No. 2017126195 (with English language translation of Office Action and English translation of categories of cited documents), 20 pages.

Notice of Allowance of Patent for Korean Patent Application No. 10-2018-7021508 dated Mar. 28, 2019 and English translation of relevant portions thereof.

Combined Office Action and Search Report dated Dec. 7, 2017 in Taiwanese Patent Application No. 106117455 (with English language translation of Office Action and English translation of categories of cited documents), 8 pp.

Extended European Search Report dated May 13, 2016 in European Patent Application No. 14804165.0.

Notice of Allowance dated Nov. 27, 2020, issued in corresponding Korean Patent Application No. 10-2020-7008960, 7 pages, with English Translation.

FIG.16
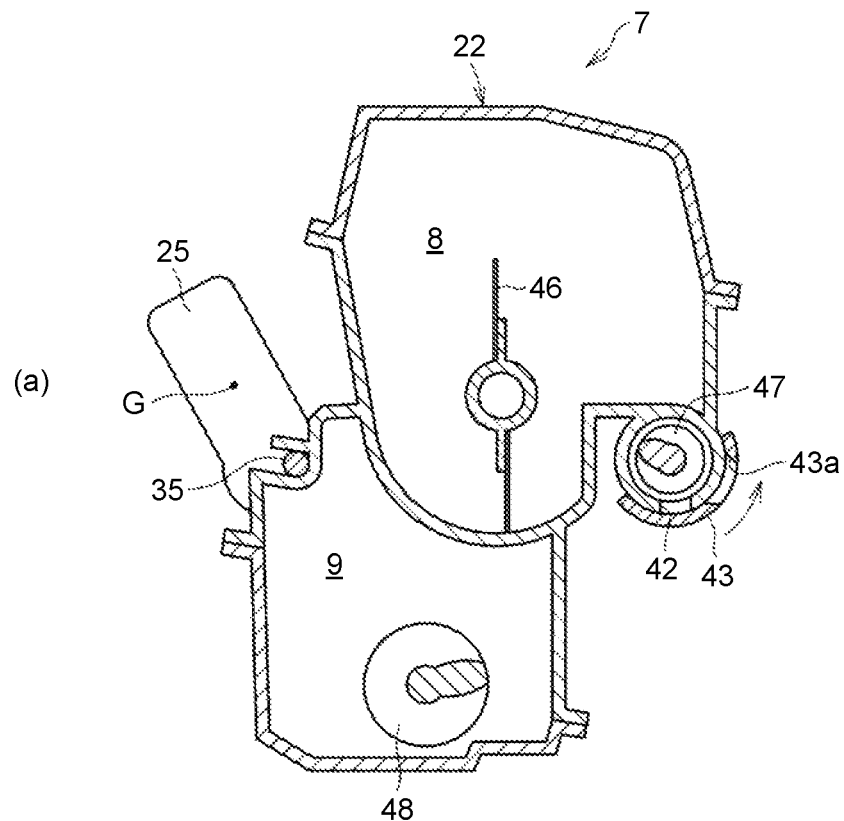
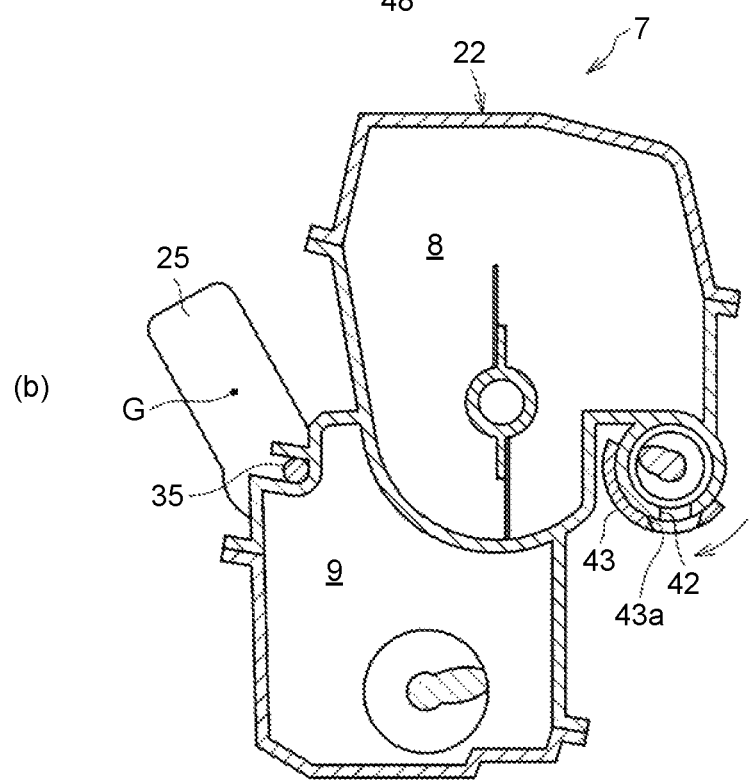

FIG.33
(a)
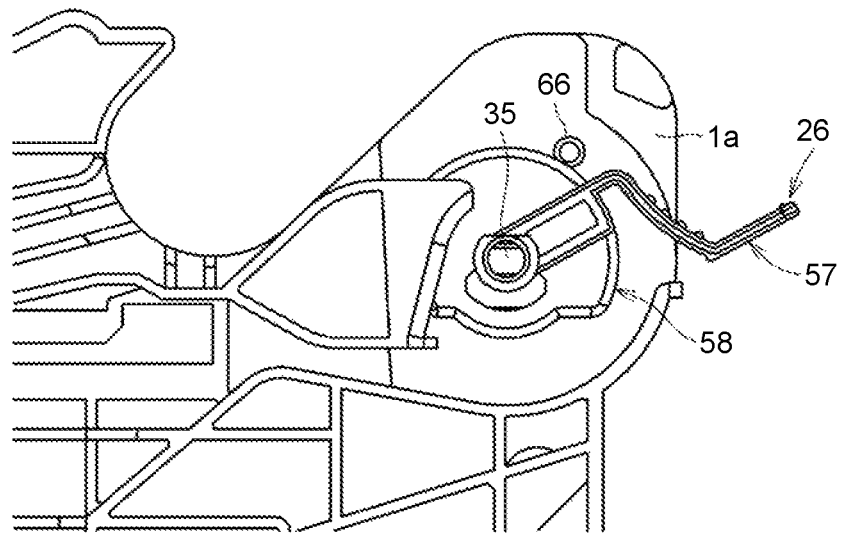
(b)
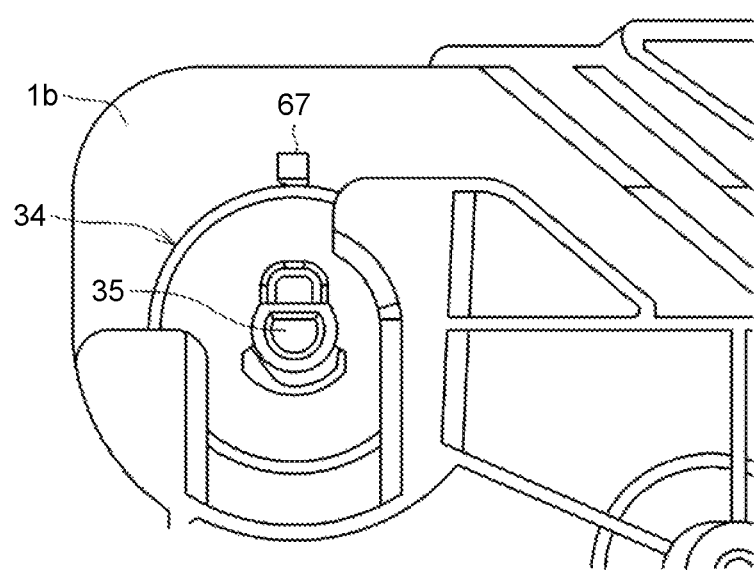

FIG.34
(a)
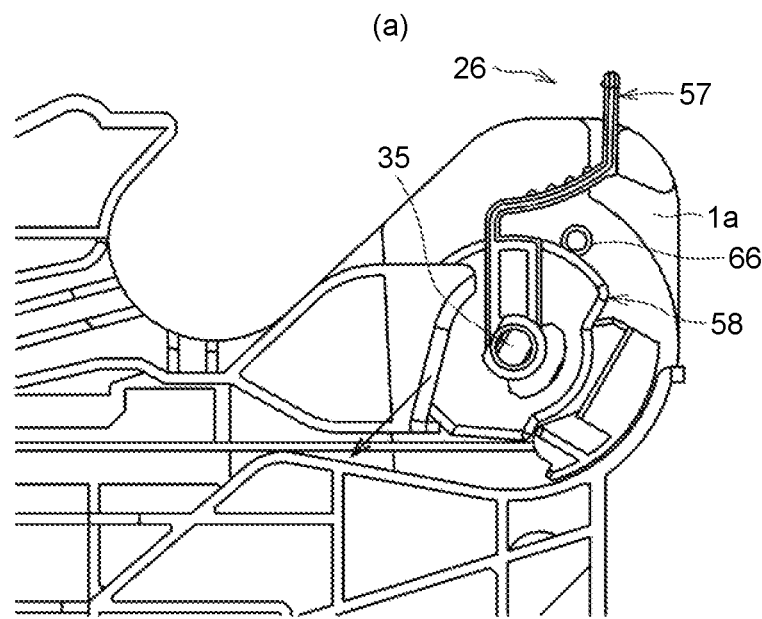
(b)
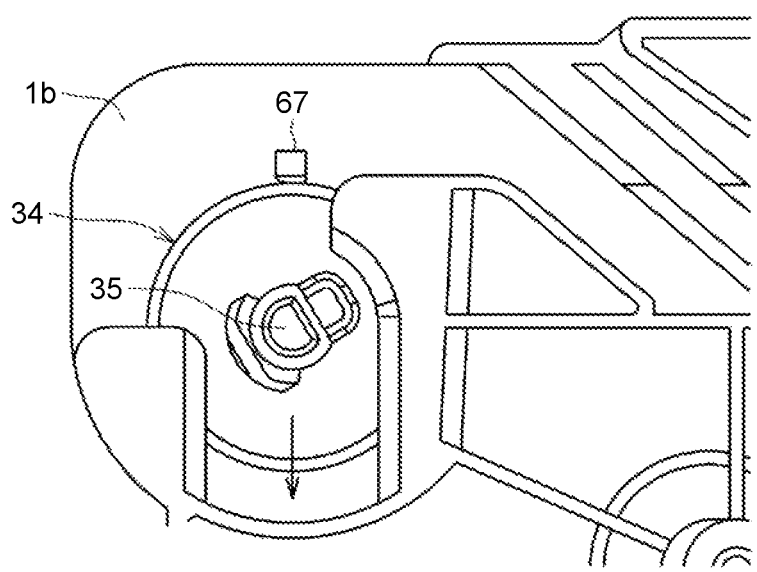

FIG.35
(a)
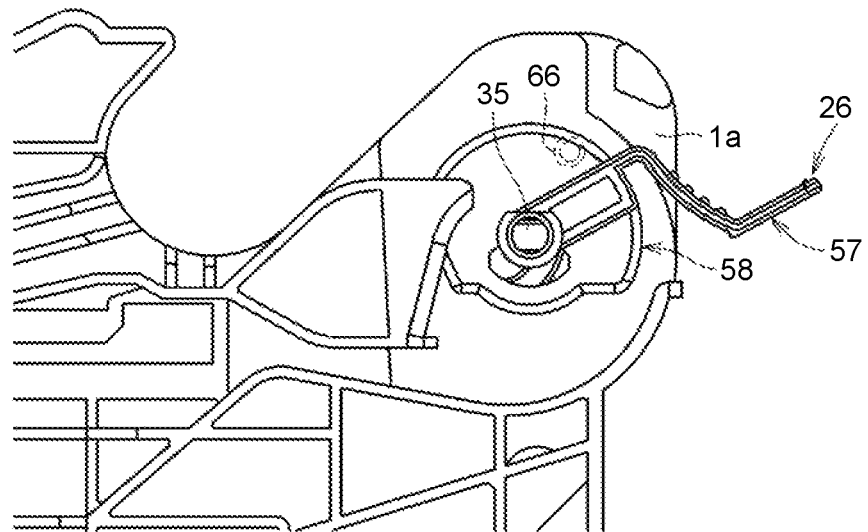
(b)
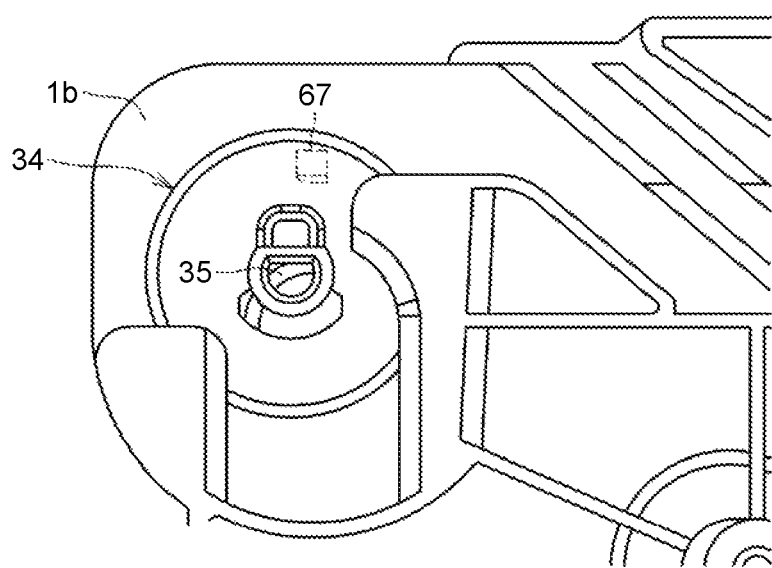

FIG.40
(a)
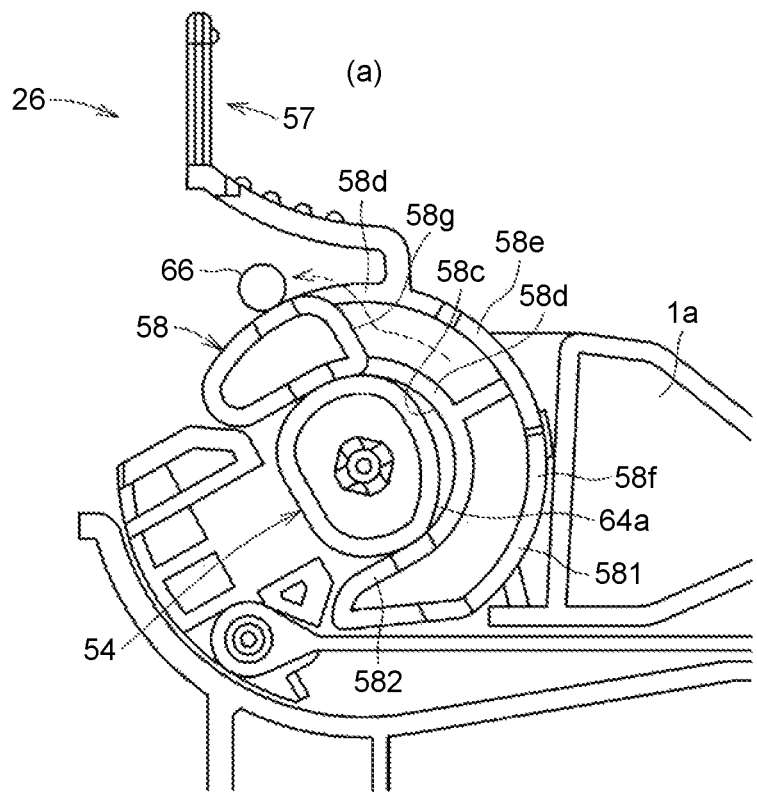
(b)
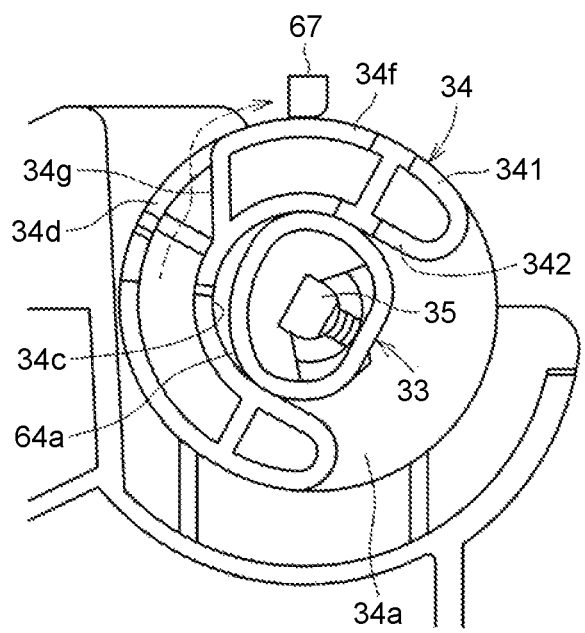

FIG.41
(a)
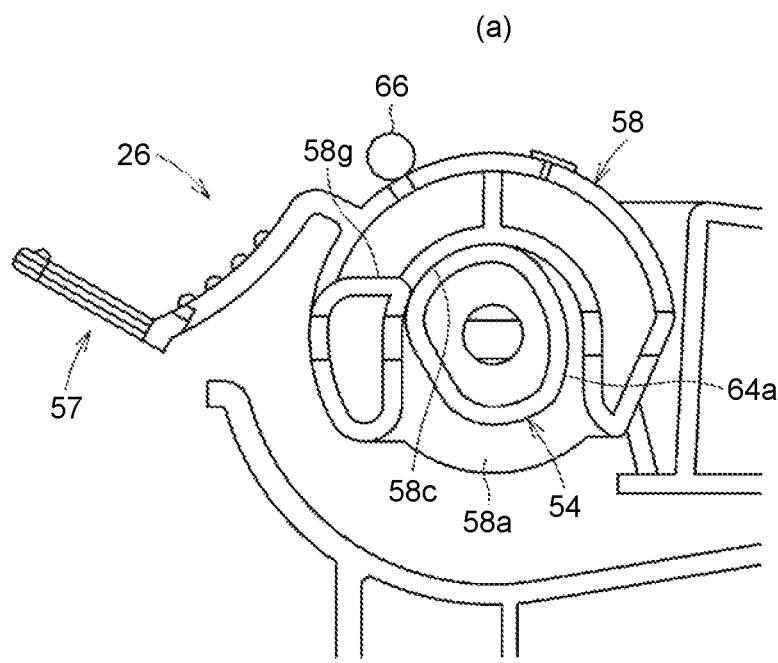
(b)
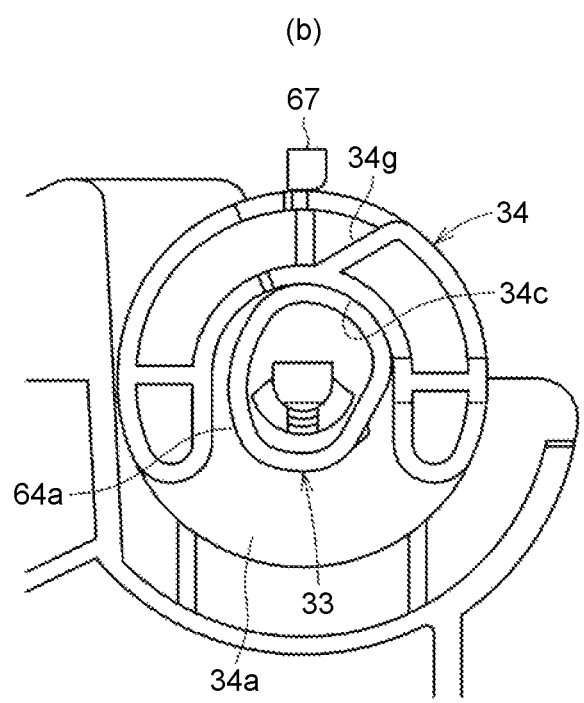

TONER CONTAINER WITH AN OPERATING STRUCTURE DISPOSED ON A FIRST SIDE, A SHUTTER DISPOSED ON A SECOND SIDE, AND A LOCK

CROSS-REFERENCE TO RELATED APPLICATIONS

The present application is a continuation of U.S. patent application Ser. No. 15/929,128, filed Apr. 30, 2019, which is a continuation of U.S. patent application Ser. No. 15/971,631, filed May 4, 2018 (now U.S. Pat. No. 10,365,584), which is a continuation of U.S. patent application Ser. No. 15/490,034, filed Apr. 18, 2017 (now U.S. Pat. No. 10,025,227), which is a divisional of U.S. patent application Ser. No. 14/893,826, filed on Nov. 24, 2015 (now U.S. Pat. No. 9,690,231), which is a U.S. National Stage Application of International Patent Application No. PCT/JP2014/065021, filed on May 30, 2014, and which claims the benefit of foreign priority to Japanese Patent Application No. 2013-114144, filed May 30, 2013, Japanese Patent Application No. 2013-141524, filed Jul. 5, 2013, and Japanese Patent Application No. 2013-162345, filed on Aug. 5, 2013. The entire contents of each of the above applications are hereby incorporated by reference in entirety.

TECHNICAL FIELD

The present invention is related to a toner container, a process cartridge to which the toner container can be detachably attached, and an image forming apparatus.

BACKGROUND ART

In an image forming apparatus such as a copying machine or a printer, it is a widely adopted method in which a toner container, which contains a toner for developing purposes, is configured to be detachably attachable to a developing device. In this method, when the toner container is attached to the developing device, a discharge port (an outlet) in the toner container gets connected to a supply port in the developing device, thereby enabling a supply of the toner from the toner container to the developing device. Typically, in such a type of the toner container, the discharge port is configured to be closable. With that, when the toner container is removed from the body of the developing device, the toner does not leak through the discharge port to the outside.

For example, in Patent Literature 1 (Japanese Patent No. 4084835), a toner cartridge (a toner container) is disclosed in which the discharge port is configured to be openable or closable by an operation of a rotating knob. Moreover, in this toner cartridge, by operating the rotating knob, it also becomes possible to fix the toner cartridge in a mounting portion.

However, regarding the toner cartridge disclosed in Patent Literature 1, in a state in which the toner cartridge is not mounted in the mounting portion; if a operator casually rotates the rotating knob, then there is a chance that the discharge port becomes open and the toner leaks out through the discharge port.

Thus, it becomes necessary to take measures in order to prevent such toner leakage. However, if a new component is to be added for that purpose, then there is a possibility that, from the perspective of the layout of components disposed in the main body of the developing device and in the toner container, positioning the additional component while avoiding interference with other surrounding components is a difficult task.

Particularly, as a result of the downsizing of devices that has occurred in recent years, in a configuration in which the components are disposed in a highly dense manner, it is difficult to secure space for disposing components. Hence, it is all the more difficult to add a new component.

In view of such issues, it is an object of an aspect of the present invention to provide a toner container in which shutter opening is prevented from occurring in a non-mounted state and which includes an operating member and a shutter that can operate in cooperation via a linking member; as well to provide a process cartridge and an image forming apparatus.

SUMMARY OF THE INVENTION

In order to solve the problem described above, the present invention is a toner container including: a container body to contain a toner and that is detachably attachable to a mounting portion in a developing device; an outlet to discharge the toner contained in the container body; a shutter to open and close the outlet; and an operating member to move the shutter, wherein in the mounting portion of the developing device, a linking member is disposed that is capable of performing a reciprocating linear movement, the shutter includes a first engaging portion to engage with the linking member, the operating member includes a second engaging portion to engage with the linking member, in a state in which the container body is not mounted in the mounting portion, the shutter and the operating member are in a non-linked state with each other, and in a state in which the container body is mounted in the mounting portion, the shutter and the operating member become able to be linked to each other via the linking member.

According to an aspect of the present invention, in a state in which a container body is not mounted in a mounting portion, a shutter and an operating member are in a non-linked state with each other. Hence, even if an operator operates the operating member, the shutter does not open. As a result, it becomes possible to prevent the toner from leaking through an outlet. Moreover, since a linking member is configured to be able to perform a reciprocating linear movement, it can be configured in a compact manner thereby enabling downsizing. Besides, the operating member and the shutter can be made to operate in cooperation via the linking member which is compact in nature. Hence, it becomes possible to achieve downsizing of the image forming apparatus, as well as to provide a toner container that can be attached to the downsized image forming apparatus.

BRIEF DESCRIPTION OF DRAWINGS

FIG. 16 is a cross-sectional view of the toner cartridge, (a) in FIG. 16 is a diagram illustrating a state in which the replenishment toner outlet is closed, and (b) in FIG. 16 is a diagram illustrating a state in which the replenishment toner outlet is open;

FIG. 33 is a diagram illustrating a preliminarily-held state, (a) in FIG. 33 illustrates a side view of a first engaging portion, and (b) in FIG. 33 is a side view of the second engaging portion;

FIG. 34 is a diagram illustrating a locked state, (a) in FIG. 34 illustrates a side view of the first engaging portion, and (b) in FIG. 34 is a side view of the second engaging portion;

FIG. 35 is a diagram illustrating a state of poor attachment, (a) in FIG. 35 illustrates a side view of the first engaging portion, and (b) in FIG. 35 is a side view of the second engaging portion;

FIG. 40 is a diagram illustrating the locked state according to the second embodiment, (a) in FIG. 40 is a side view of the first engaging portion, and (b) in FIG. 40 is a side view of the second engaging portion;

FIG. 41 is a diagram illustrating the preliminarily-held state according to the second embodiment, (a) in FIG. 41 is a side view of the first engaging portion, and (b) in FIG. 41 is a side view of the second engaging portion;

DESCRIPTION OF EMBODIMENTS

First Embodiment

Figure 1:
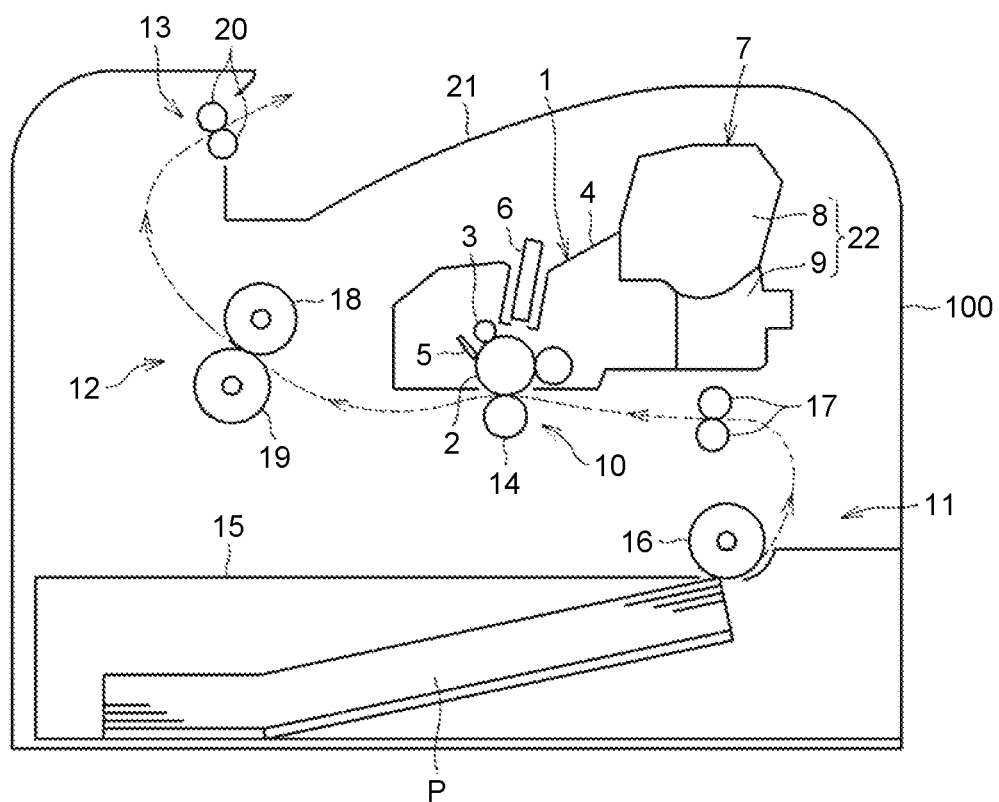
FIG. 1 is an overall configuration diagram illustrating an embodiment of an image forming apparatus.

Given below is the explanation of the present invention with reference to the accompanying drawings. Herein, in the drawings used in explaining the present invention, regarding the constituent elements such as members or constituent components having the same function or the same shape, same reference numerals are used to a maximum extent of distinction and the explanation is not repeated after given once.

FIG. 1 is an overall configuration diagram illustrating an embodiment of an image forming apparatus. Firstly, explained below with reference to FIG. 1 is an overall configuration and operations of the image forming apparatus.

The image forming apparatus illustrated in FIG. 1 is a monochromatic image forming apparatus. In an apparatus main body (an image-forming-apparatus main body) 100, a process unit 1 functioning as an imaging unit is mounted in a detachable manner. The process unit 1 includes a photosensitive member 2 that functions as an image carrier for carrying an image on the surface thereof; a charging roller 3 that functions as a charging unit for charging the surface of the photosensitive member 2; a developing device 4 that functions as a developing unit for converting a latent image formed on the photosensitive member 2 into a visible image; and a cleaning blade 5 that functions as a cleaning unit for cleaning the outer surface of the photosensitive member 2. Moreover, at a position opposite to the photosensitive member 2, an LED head array 6 (LED stands for light emitting diodes) is disposed that functions as an exposing unit for exposing the outer surface of the photosensitive member 2 to light.

Furthermore, a toner cartridge 7 that serves as a toner container is detachably attached to the upper surface (a mounting portion) of the developing device 4 of the process unit 1. The toner cartridge 7 has a container body 22 that includes a toner containing unit 8 for housing a toner, which is a toner to be supplied to the developing device 4. Moreover, in the present embodiment, the toner cartridge 7 also includes, in an integrated manner, a toner collecting unit 9 that collects the toner removed by the cleaning blade 5 (i.e., collects waste toner).

Meanwhile, the image forming apparatus also includes a transfer device 10 that transfers an image onto a paper sheet serving as a recording medium; a paper feeding device 11 that feeds paper sheets; a fixing device 12 that fixes an image, which has been transferred onto a paper sheet, to the paper sheet; and a paper discharging device 13 that discharges a paper sheet to the outside of the image forming apparatus.

The transfer device 10 includes a transfer roller 14 functioning as a transfer member. In the state in which the process unit 1 is mounted in the apparatus main body 100, the transfer roller 14 abuts against the photosensitive member 2. As a result, a transfer nip is formed at the abutting portion between the transfer roller 14 and the photosensitive member 2. Besides, the transfer roller 14 is connected to a power source (not illustrated) and is applied with a predetermined direct-current (DC) voltage or a predetermined alternating-current (AC) voltage.

The paper feeding device 11 includes a paper feeding cassette 15 in which paper sheets P are housed, and a paper feeding roller 16 that feeds the paper sheets P housed in the paper feeding cassette 15. On the downstream side in the paper conveying direction of the paper feeding roller 16, a pair of registration rollers 17 is disposed that serves as a pair of timing rollers for clocking the conveying timing and accordingly conveying a paper sheet to a secondary transfer nip. Meanwhile, examples of the paper sheet P include a cardboard sheet, a postcard, an envelope, a plain paper sheet, a thin paper sheet, a coated paper sheet (such as a coat paper sheet or an art paper sheet), or a tracing paper sheet. Moreover, as far as the recording media other than paper sheets are concerned, it is possible to use OHP sheets or OHP films (OHP stands for overhead projector).

The fixing device 12 includes a fixing roller 18 functioning as a fixing member, and a pressure roller 19 functioning as a pressure member. The fixing roller 18 is heated by a heat source such as a heater (not illustrated). The pressure roller 19 is pressurized toward the fixing roller 18 and abuts against the fixing roller 18. As a result, a fixing nip is formed at the abutting location.

The paper discharging device 13 includes a pair of paper discharging rollers 20. A paper sheet that is discharged to the outside of the image forming apparatus by the paper discharging rollers 20 is stacked on a catch tray 21 that is formed by making a depression on the upper surface of the apparatus main body 100.

Next, explained below with reference to FIG. 1 is an imaging operation performed in the image forming apparatus according to the present embodiment.

Once the imaging operation is started, the photosensitive member 2 is rotary-driven, and the surface of the photosensitive member 2 is uniformly charged to a predetermined polarity. Then, based on image information received from a reading device (not illustrated) or a computer (not illustrated), the charged surface of the photosensitive member 2 is exposed to light from the LED head array 6. As a result, an electrostatic latent image is formed on the charged surface of the photosensitive member 2. Then, the developing device 4 supplies a toner to the electrostatic latent image formed on the photosensitive member 2. As a result, the electrostatic latent image is developed as a toner image (i.e., converted into a visible image).

Meanwhile, once the imaging operation is started, the paper feeding roller 16 starts rotary-driving so that a paper sheet P is fed from the paper feeding cassette 15. However, at the registration rollers 17, the paper sheet P is temporarily stopped from being conveyed further. Then, at a predetermined timing, the registration rollers 17 start rotary-driving and convey the paper sheet P to the transfer nip in synchronization with the timing at which a toner image formed on the photosensitive member 2 reaches the transfer nip.

At that time, to the transfer roller 14, a transfer voltage is applied that has the opposite polarity to the polarity of toner charging for the toner image formed on the photosensitive member 2. As a result, a transfer electrical field is formed at the transfer location. Because of the transfer electrical field, the toner image formed on the photosensitive member 2 is transferred onto the paper sheet P. Then, the residual toner that is not transferred onto the paper sheet P and that remains on the photosensitive member 2 is removed by the cleaning blade 5 and is collected by the toner collecting unit 9 in the toner cartridge 7.

The paper sheet P onto which a toner image has been transferred is then conveyed to the fixing device 12, and passes through the fixing nip formed between the fixing roller 18 and the pressure roller 19. As a result, the paper sheet P gets heated and pressurized, and the toner image gets fixed to the paper sheet P. Then, the paper sheet P is discharged by the paper discharging rollers 20 to the outside of the image forming apparatus and is stacked in the catch tray 21.

Figure 2:
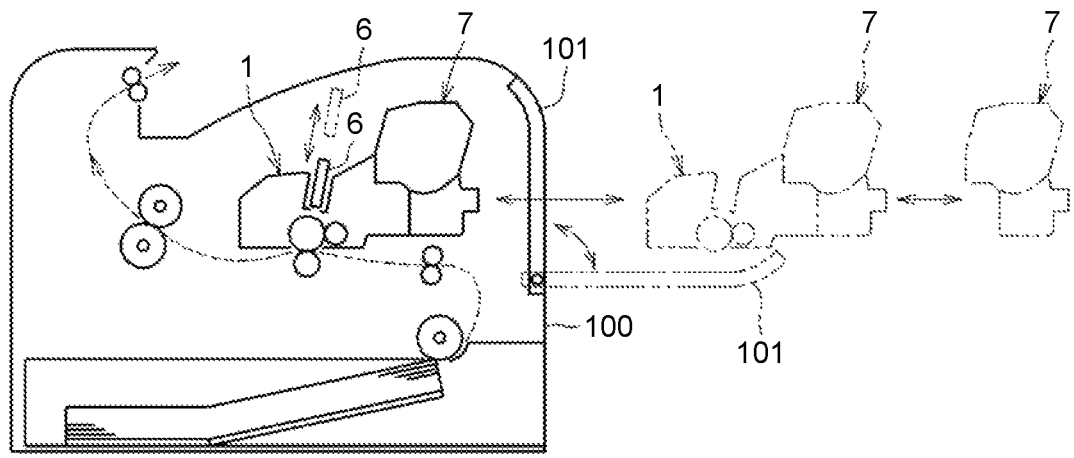
FIG. 2 is a diagram illustrating a method of attaching and removing a process unit.

FIG. 2 is a diagram illustrating a method of attaching and removing the process unit.

As illustrated in FIG. 2, in the present embodiment, a cover 101 attached to the front portion of the apparatus main body 100 is openable and closable in nature. When the cover 101 is kept open, the LED head array 6 becomes able to retract upward via a link mechanism (not illustrated). With such a configuration, when the cover 101 is kept open, the process unit 1 can be removed from the front side of the image forming apparatus (i.e., from the side facing the direction of travel of a discharged paper sheet P; or from the right-hand side with reference to FIG. 2) while avoiding interference with the LED head array 6. At that time, in the state in which the toner cartridge 7 is attached to the process unit 1, the toner cartridge 7 and the process unit 1 can be removed as an integrated process cartridge from the front side of the apparatus main body 100.

Moreover, regardless of whether the process unit 1 is attached to the apparatus main body 100 or is removed from the apparatus main body 100, the toner cartridge 7 can be attached to or removed from the process unit 1.

Figure 3:
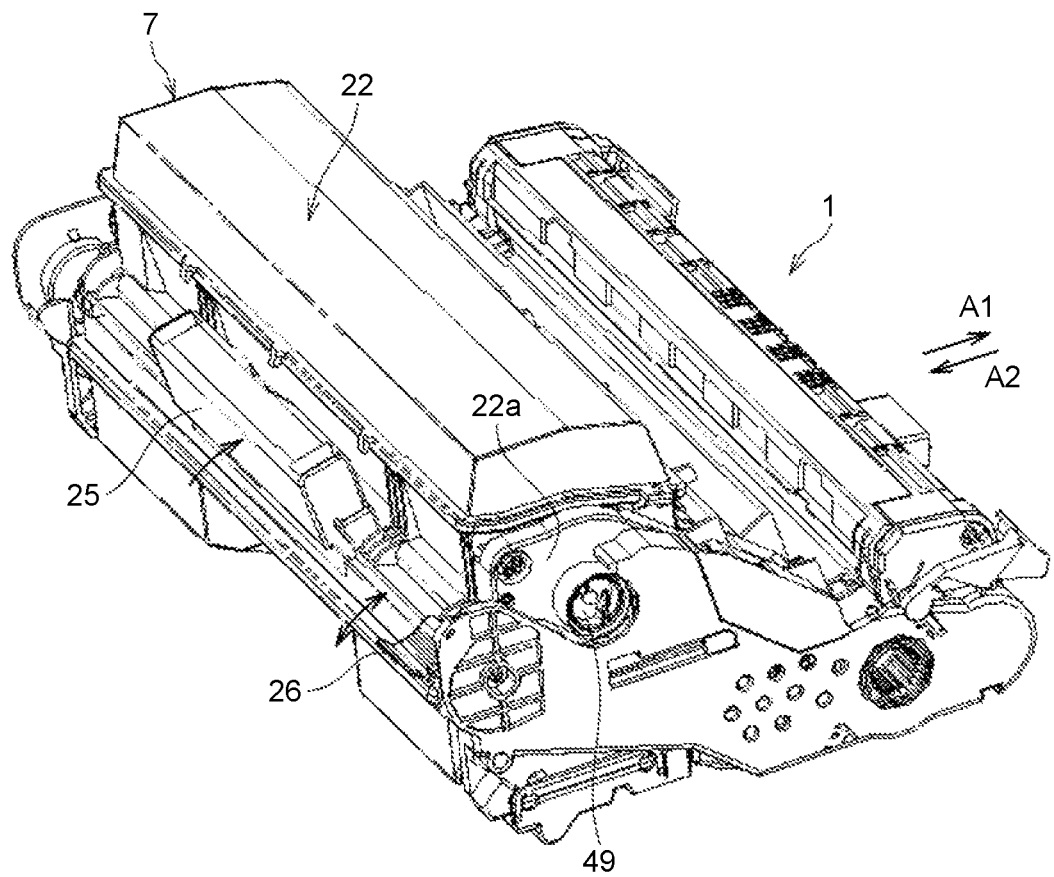
FIG. 3 is a perspective view of the state in which a toner cartridge is attached to the process unit.
Figure 4:
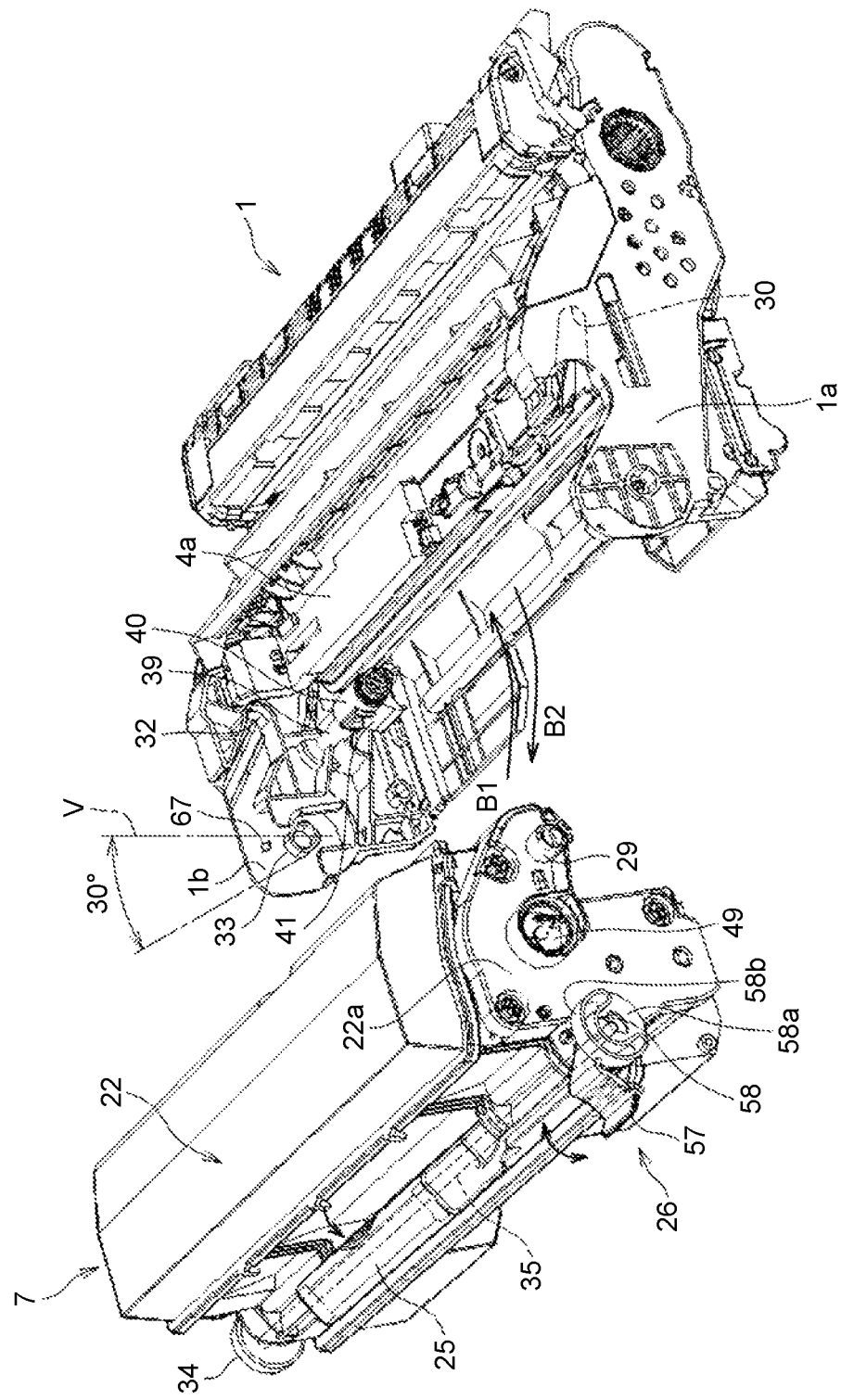
FIG. 4 is a perspective view of the state in which the toner cartridge is removed from the process unit.

FIG. 3 is a perspective view of a state in which the toner cartridge is attached to the process unit. FIG. 4 is a perspective view of a state in which the toner cartridge is removed from the process unit.

With reference to FIG. 3, the direction indicated by an arrow A1 represents the direction of attachment at the time of attaching the process unit 1 and the toner cartridge 7 to the apparatus main body 100. Moreover, the direction indicated by an arrow A2 represents the direction of removal at the time of removing the process unit 1 and the toner cartridge 7 from the apparatus main body 100.

In the following explanation, in the toner cartridge 7 and the process unit 1, the front side of the direction of attachment A1 (or the front side of a direction of attachment B1) is referred to as the far side, and the rear side opposite to the front side is referred to as the near side. Moreover, the right-hand side and the left-hand side are defined while facing the front side of the direction of attachment A1 (or the direction of attachment B1).

Figure 7:
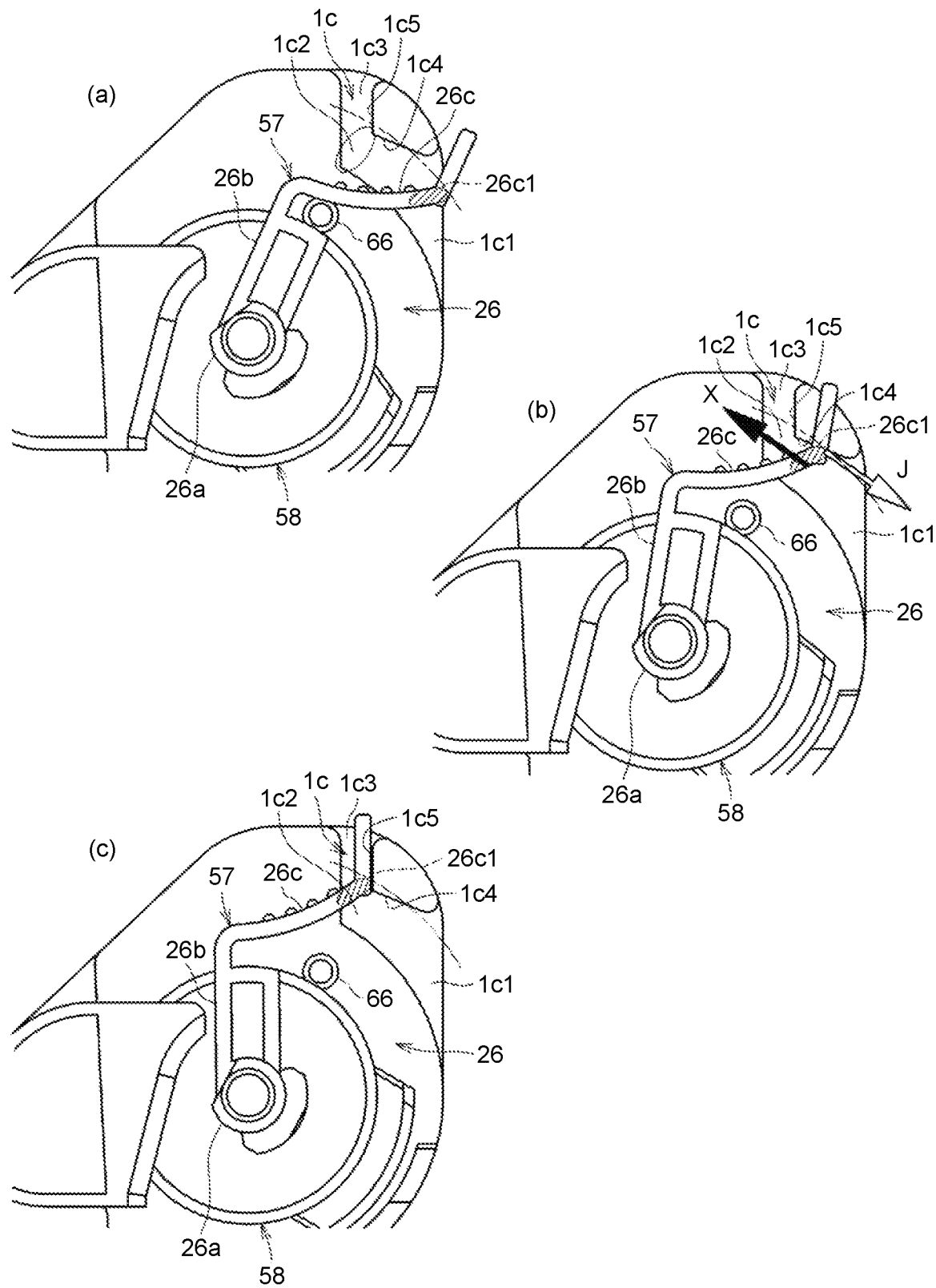
FIG. 7 is a diagram illustrating a view from inside of a configuration on the right-hand side of the process unit and the toner cartridge in the state in which the toner cartridge is attached to the process unit, (a) in FIG. 7 is a diagram illustrating the unlocked state, (b) in FIG. 7 is a diagram illustrating a state during locking, and (c) in FIG. 7 is diagram illustrating the locked state.

On the near side in the direction of attachment of the toner cartridge 7, a gripper 25 is disposed that can be gripped by an operator while attaching the toner cartridge 7 to or removing the toner cartridge 7 from the apparatus main body 100 or the process unit 1. The gripper 25 is attached in a pivotable manner with respect to a shaft 35 (see FIG. 4) that is a columnar rod disposed parallel to the longitudinal direction of container body 22. At the time of removing the toner cartridge 7 and the process unit 1 from the apparatus main body 100 or at the time of removing the toner cartridge 7 from the process unit 1; as illustrated in FIG. 4, the gripper 25 is pivoted toward the near side so that it becomes possible to grip the gripper 25. On the other hand, after the toner cartridge 7 and the process unit 1 are attached to the apparatus main body 100; as illustrated in FIG. 7, the gripper 25 is pivoted toward the far side so that it becomes possible to keep the gripper 25 in a housed state. Moreover, the center of pivoting of the gripper 25 (i.e., the shaft 35) is set to be located lower than a gravity point G of the gripper 25 (see (a) and (b) in FIG. 16). Hence, in the attached state of the process unit 1 as illustrated in FIG. 2, even if the operator forgets to rotate the gripper 25 toward the far side, the cover 101 can be pivoted from below until it touches the gripper 25 and then the gripper 25 can be pivoted together to keep it in the housed state.

Figure 44:
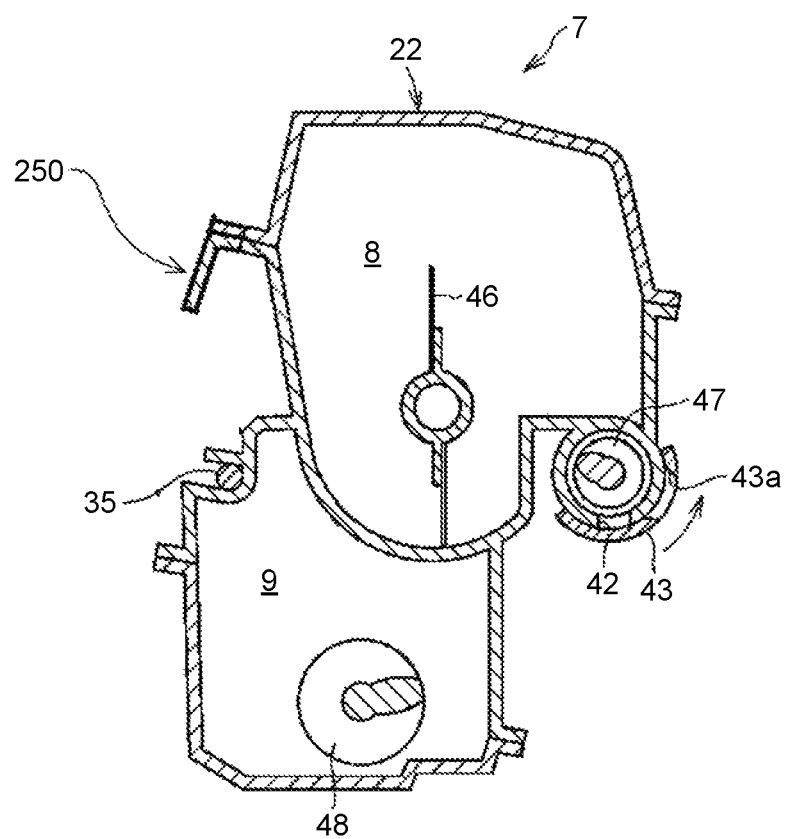
FIG. 44 is a cross-sectional view of the toner cartridge with a gripper.

It is noted that the abovementioned gripper may be not pivotable to but may be fixed to the cover 101 as long as the gripper has such a size that the cover 101 can be closed without the gripper interfering with the cover. FIG. 44 illustrates a gripper 250 in another embodiment. The gripper 250 is arranged at the center in the longitudinal direction of the container body and above the shaft 35. Also in this structure, the operator can carry the toner cartridge 7 and the process unit 1 as an integrated process cartridge in a way of holding similar to that illustrated in FIG. 21.

Explained below with reference to FIGS. 3 to 16 is more detailed explanation about the configuration of the toner cartridge 7 and the process unit 1.

As illustrated in FIG. 4, on a right-hand side 22a of the container body 22, a operating member 26 that is pivotable is disposed. The operating member 26 is fixed to the right-hand end of the shaft 35, and rotates along with the shaft 35. In order to make the shaft 35 rotatable with respect to the container body 22, the shaft 35 is pivotably supported with bearings 27a and 27b (see FIG. 5) at both ends of the container body 22.

Figure 6:
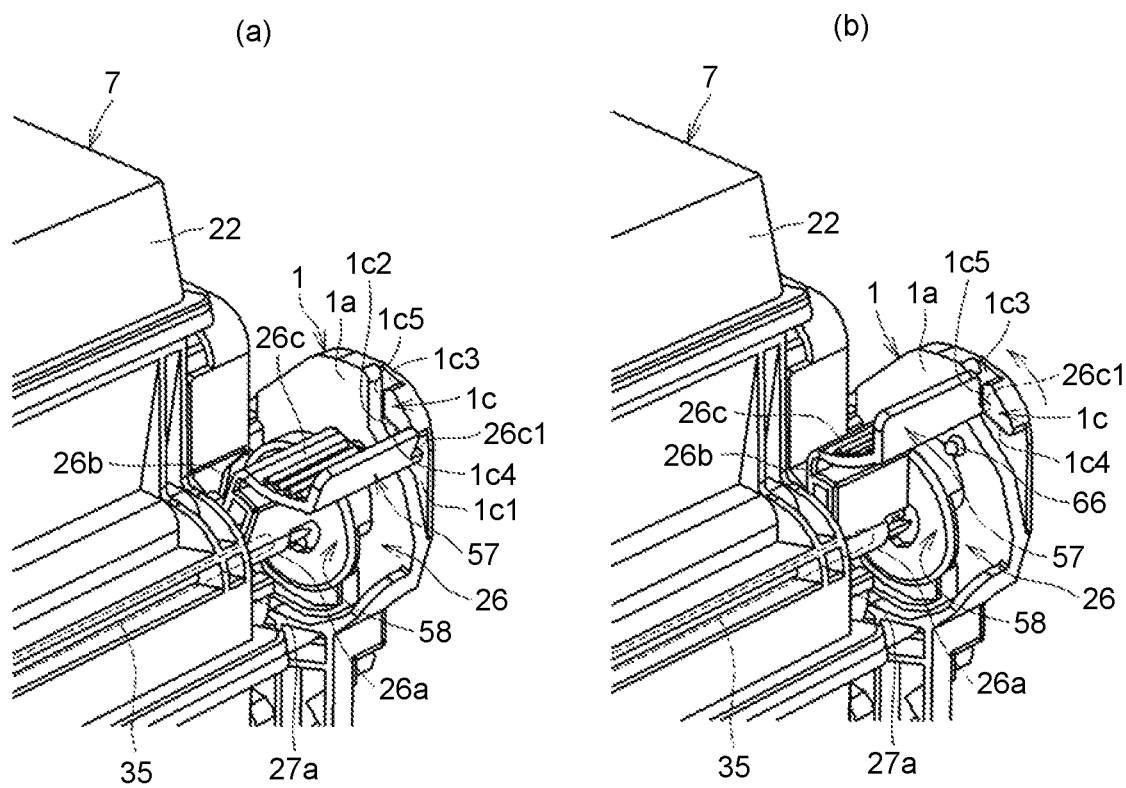
FIG. 6 is a perspective view illustrating a configuration on the right-hand side of the process unit and the toner cartridge in the state in which the toner cartridge is attached to the process unit, (a) in FIG. 6 is a diagram illustrating an unlocked state, and (b) in FIG. 6 is diagram illustrating a locked state.

As illustrated in FIGS. 6 and 7, the operating member 26 includes, in an integrated manner, a lever 57 and a first engaging portion 58 that rotates along with the shaft 35. The lever 57 includes a fixing portion 26a to which the shaft 35 is fixed; an extending portion 26b that extends from the fixing portion 26a in a direction perpendicular to the axis direction of the shaft 35; and a plate portion 26c that, when viewed from the axis direction of the shaft 35, bends from the extending portion 26b and extends further. In other words, the plate portion 26c extends at an angle with respect to the radial direction from the center of the shaft 35.

Figure 14:
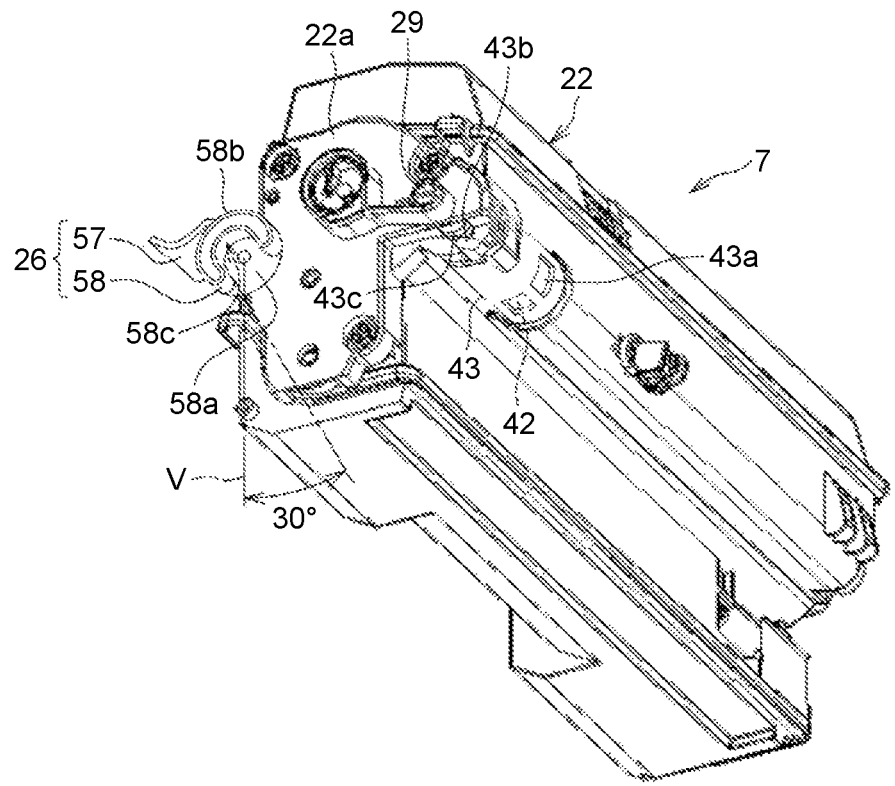
FIG. 14 is a perspective view of the toner cartridge illustrating a position of disposing a replenishment toner outlet shutter.
Figure 20:
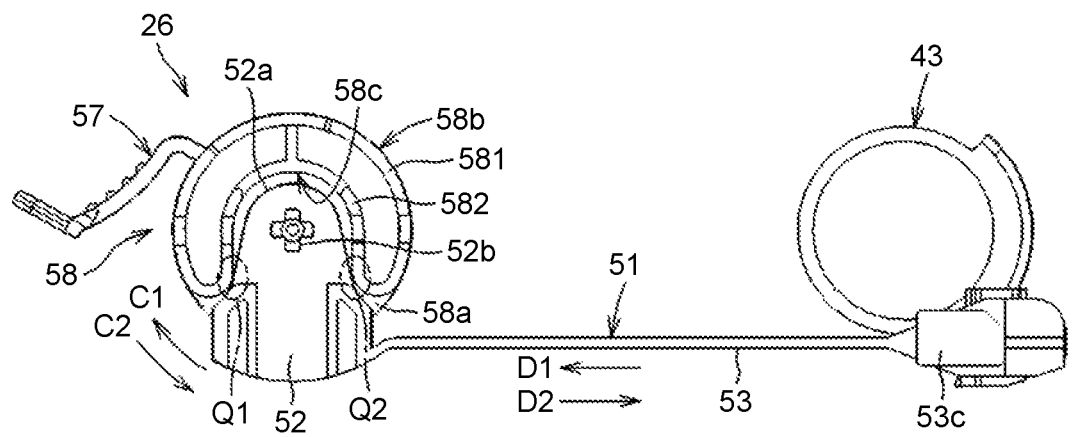
FIG. 20 is a side view illustrating a coupled state of the operating member, the shutter, and the linking member when the toner cartridge is attached to the developing device of the process unit.
Figure 29:
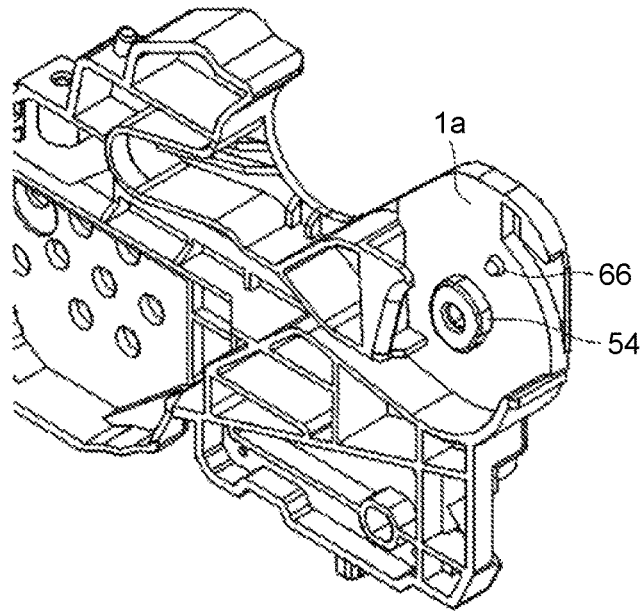
FIG. 29 is a perspective view illustrating the right-hand side of the process cartridge.

As illustrated in FIG. 14, the first engaging portion 58 includes, in an integrated manner and at one end of the shaft 35, a baseplate portion 58a, which is disk-shaped and extends in a direction perpendicular to the axis direction of the shaft 35, and an erected portion 58b, which is erected from the baseplate portion 58a in the axis direction of the shaft 35. As illustrated in FIG. 20, the erected portion 58b extends in the circumferential direction of the baseplate portion 58a and has a double-walled structure with both ends thereof in the circumferential direction being closed. The erected portion 58b has an outer wall 581 on the radially outside and has an inner wall 582 on the radially inside. The portion in between the two ends in the circumferential direction of the erected portion 58b is open toward a direction perpendicular to the axis direction, and the inner periphery of the inner wall 582 forms a first engaging surface 58c that has an U-shaped edge when viewed from the axis direction. The operating member 26 is attached to one end of the shaft 35 with the tops of the erected portion 58b of the first engaging portion 58 pointing outward. At the time of attaching the toner cartridge 7 to the process unit 1, a supporting portion 54 (see FIG. 29), which is a boss and arranged on a right-hand side 1a of the process unit 1, engages with the first engaging surface 58c. Herein, as long as the first engaging portion 58 is able to pivot in conjunction with the lever 57, it can have an arbitrary configuration. Thus, aside from the configuration explained above in which the lever 57 and the first engaging portion 58 are formed in an integrated manner, it is also possible to treat the lever 57 and the first engaging portion 58 as separate members and to attach them to the shaft 35 separately.

Thus, the toner cartridge 7 can be fixed to the process unit 1 by pivoting the operating member 26. More particularly, as illustrated in (a) FIG. 6, on the right-hand top of the plate portion 26c of the operating member 26, a locking portion 26c1 is formed as a protrusion that can engage with an engaging portion 1c that is formed as a mounting-portion-side engaging portion on the right-hand side 1a of the process unit 1. The side 1a is the inner wall surface opposite to the right-hand side of the toner cartridge 7.

In other words, the engaging portion 1c is formed on the abovementioned inner wall surface and serves as a guiding groove in which the protrusion of the locking portion 26c1 can enter. The engaging portion 1c includes an open portion 1c1 from where the groove starts and goes into the right-hand side 1a from the near vertical side of the right-hand side 1a; includes a curved portion 1c2 in which the groove bends midway; and an open portion 1c3 from which the groove escapes to the upper horizontal side of the right-hand side 1a. Moreover, of the two side surfaces of the groove of the engaging portion 1c when viewed from the axis direction of the shaft 35, the side surface that is farther from the axis center and that ranges from the open portion 1c1 to the curved portion 1c2 serves as a sliding surface 1c4 on which the locking portion 26c1 moves in a sliding manner. Moreover, an engaging surface 1c5 is present that is connected to the sliding surface 1c4, that extends in the vertical direction from the curved portion 1c2 to the open portion 1c3, and with which the locking portion 26c1 engages.

Given below is the explanation of a sequence of operations of the operating member 26 in the state in which the toner cartridge 7 is attached to the process unit 1.

Figure 8:
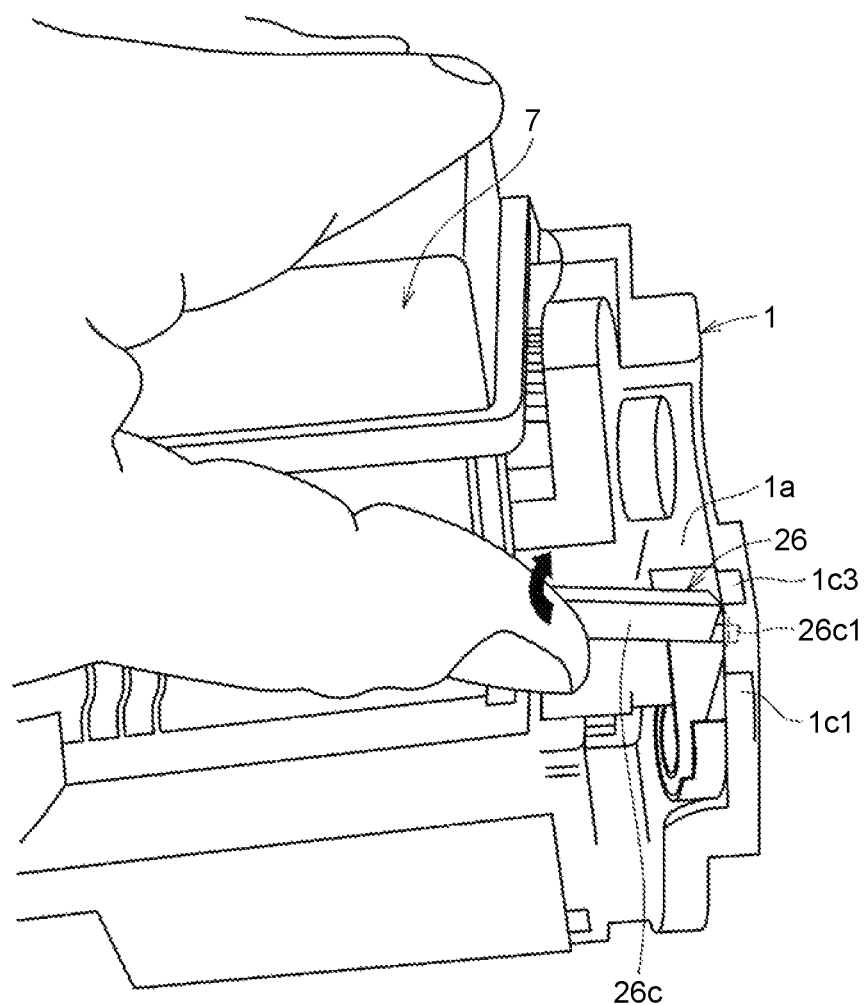
FIG. 8 is a diagram illustrating the state during locking when viewed from the front side of the toner cartridge.

Firstly, as illustrated in FIG. 6(a) and FIG. 7(a), in the state in which the toner cartridge 7 is attached to but not yet locked with the process unit 1, the operator either holds the top and the bottom of the plate portion 26c of the operating member 26 with fingers or presses the plate portion 26c from below to apply a pressing force to the operating member 26 and pivots the operating member 26 to press it toward the far side. As a result, the locking portion 26c1 reaches the open portion 1c1 at the near vertical side of the engaging portion 1c. Moreover, if a pressing force is applied to the plate portion 26c of the operating member 26 to pivot it toward the far side; then, as illustrated in FIG. 7(b), the locking portion 26c1 moves while contacting with (sliding on) the sliding surface 1c4. Because of the contacting between the locking portion 26c1 and the sliding surface 1c4, a braking force J gets applied in the opposite direction to a pressing force X applied to the operating member 26 (i.e., the braking force J gets applied against the pressing force X). Herein, the plate portion 26c is formed with a single plate of resin such as polystyrene that is elastically deformable to an extent. Hence, as illustrated in FIG. 8, the plate portion 26c gets pressed in a deformed manner toward the far side from the locking portion 26c1 as the pivot point. Then, as illustrated in FIG. 7(c), once the locking portion 26c1 reaches the curved portion 1c2, there is an end to the sliding state of the locking portion 26c1 with respect to the sliding surface 1c4, and the locking portion 26c1 abuts against the engaging surface 1c5. In this way, the state in which the locking portion 26c1 remains abutted against the engaging surface 1c5 is the locked state. Moreover, in the locked state, the plate portion 26c is released from the elastically deformed state and returns to the original shape. Furthermore, the plate portion 26c takes such an orientation that the locking portion 26c1 is positioned to abut against the engaging surface 1c5. With that, even if an unexpected force gets applied thereby causing the plate portion 26c of the operating member 26 to pivot toward the near side, the plate portion 26c does not undergo deformation unless a substantially large force is applied. Hence, the locking portion 26c1 also does not go over the engaging surface 1c5.

On the other hand, if the operator presses the plate portion 26c from above using fingers and pivots the operating member 26 toward the near side, then plate portion 26c undergoes elastic deformation from the locking portion 26c1 as the pivot point and in the opposite direction to the case in which it is pressed to the far side as described above. Then, the engagement between the locking portion 26c1 and the engaging portion 1c is released, and the state is switched to a lock-released state.

Figure 10:
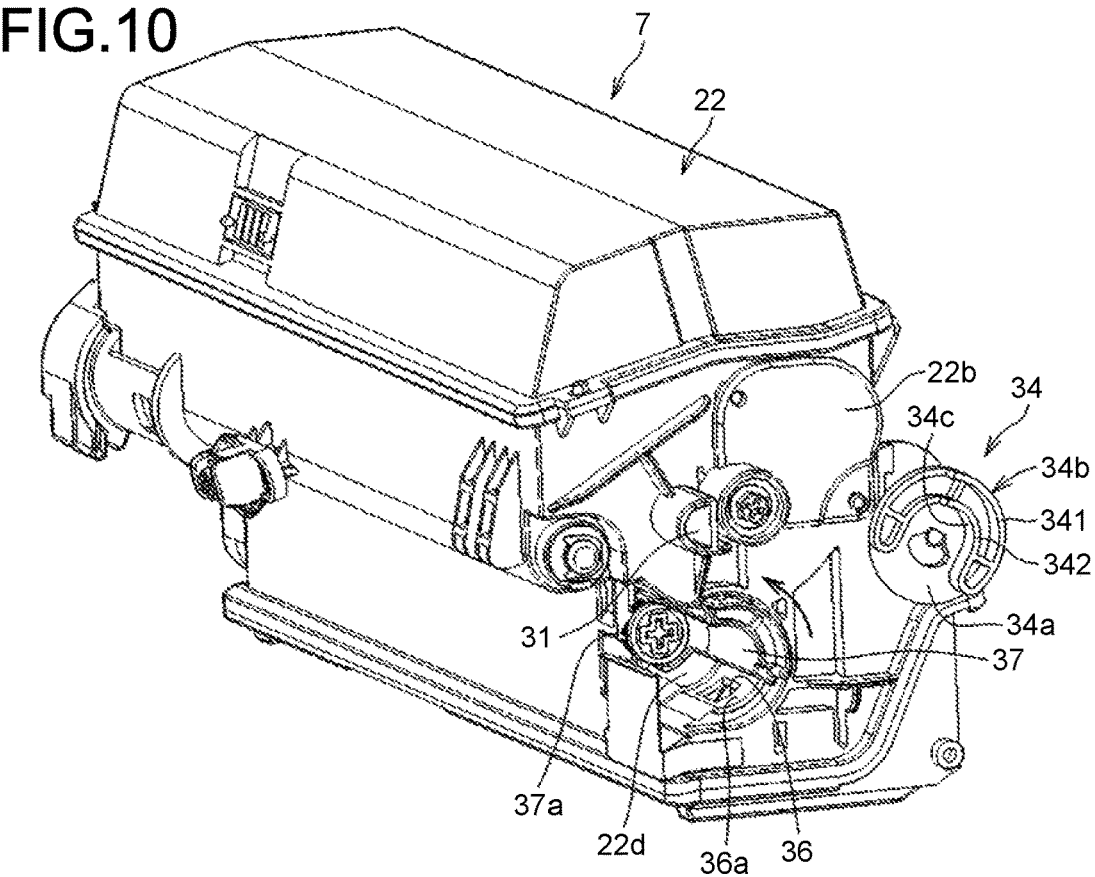
FIG. 10 is a perspective view of the toner cartridge in a state in which a waste toner inlet is opened.

Meanwhile, as illustrated in FIG. 4, on the right-hand side 22a of the container body 22, a positioning projection 29 in the form of a cylindrical protrusion is disposed for the purpose of determining the position of the toner cartridge 7 with respect to the process unit 1. In an identical manner, on a left-hand side 22b of the container body 22 as illustrated in FIG. 10, a positioning projection 31 in the form of a protrusion having a half-moon shaped cross-sectional surface is disposed for the purpose of determining the position of the toner cartridge 7 with respect to the process unit 1. Correspondingly, on the right-hand side 1a and the left-hand side 1b of the process unit 1, groove-like guiding portions 30 and 32 are respectively formed (see FIG. 4) in such a way that the curved surfaces of the positioning projections 29 and 31 abut against the guiding portions 30 and 32.

As illustrated in FIG. 10, on the left-hand side 22b of the container body 22, a second engaging portion 34 is attached in a pivotable manner. In an identical manner to the first engaging portion 58, the second engaging portion 34 includes, in an integrated manner, a baseplate portion 34a, which is disk-shaped and extends in a direction perpendicular to the axis direction of the shaft 35, and an erected portion 34b, which is erected from the baseplate portion 34a in the axis direction of the shaft 35. The baseplate portion 34a is attached to the other end of the shaft 35. The erected portion 34b extends in the circumferential direction of the baseplate portion 34a and has a double-walled structure with both ends thereof in the circumferential direction being closed. Hence, the erected portion 34b includes an outer wall 341 on the radially outside and an inner wall 342 on the radially inside. The portion in between the two ends in the circumferential direction of the erected portion 34b is open toward a direction perpendicular to the axis direction, and the inner periphery of the inner wall 342 forms a second engaging surface 34c that has an U-shaped edge when viewed from the axis direction. At the time of attaching the toner cartridge 7 to the process unit 1, a supporting portion 33 (see FIG. 4), which is a boss and formed on the left-hand side 1b of the process unit 1, engages with the second engaging surface 34c.

In the present embodiment, the second engaging portion 4 is coupled with the shaft 35 (see FIG. 4) to which the operating member 26 is also coupled. Thus, when the operating member 26 is pivoted either in the forward direction or reverse, the second engaging portion 34 also pivots either in the forward direction or reverse in conjunction. Moreover, in the present embodiment, the gripper 25 is also attached to the shaft 35 that is couples the first engaging member 34 and the operating member 26. However, the gripper 25 is configured to be pivotable independent of the shaft 35, and is configured not to operate in conjunction with the operating member 26.

Figure 5:
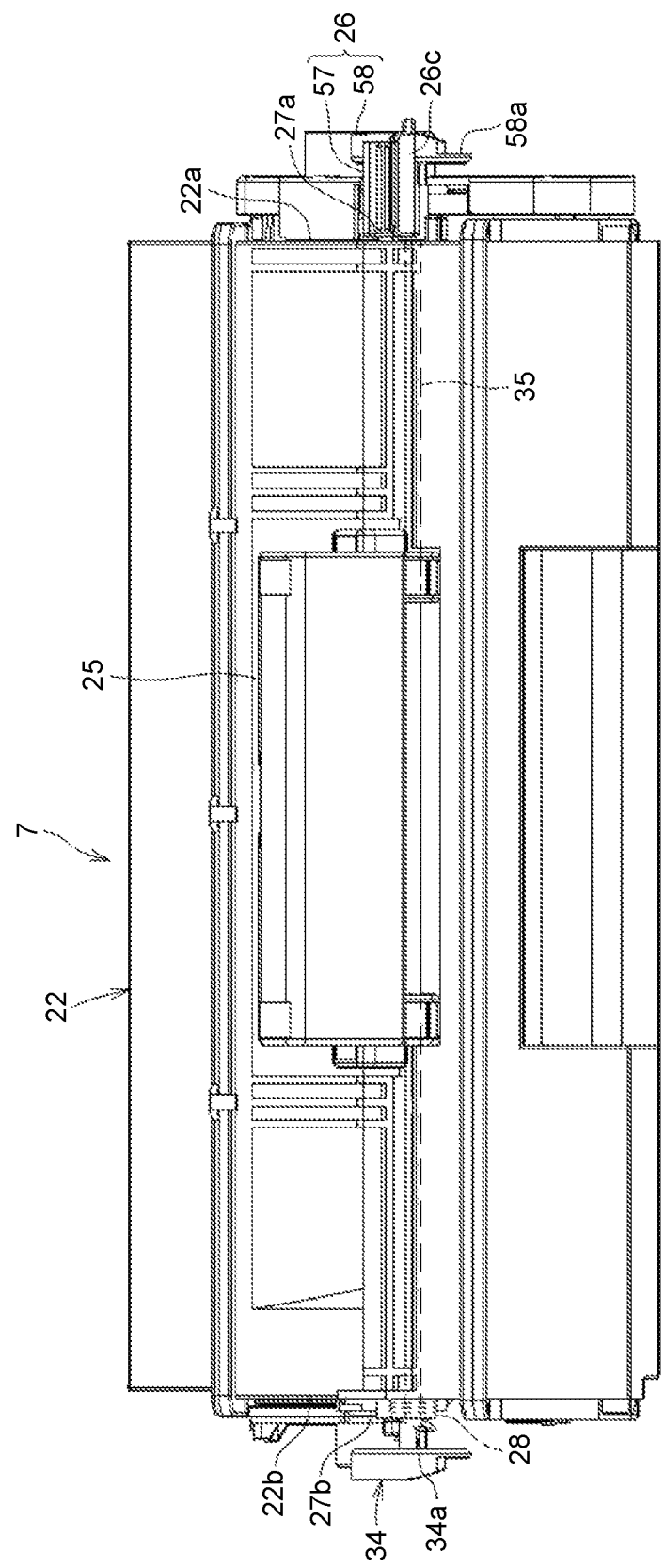
FIG. 5 is a diagram of a view from the near side of the toner cartridge.
Figure 9:
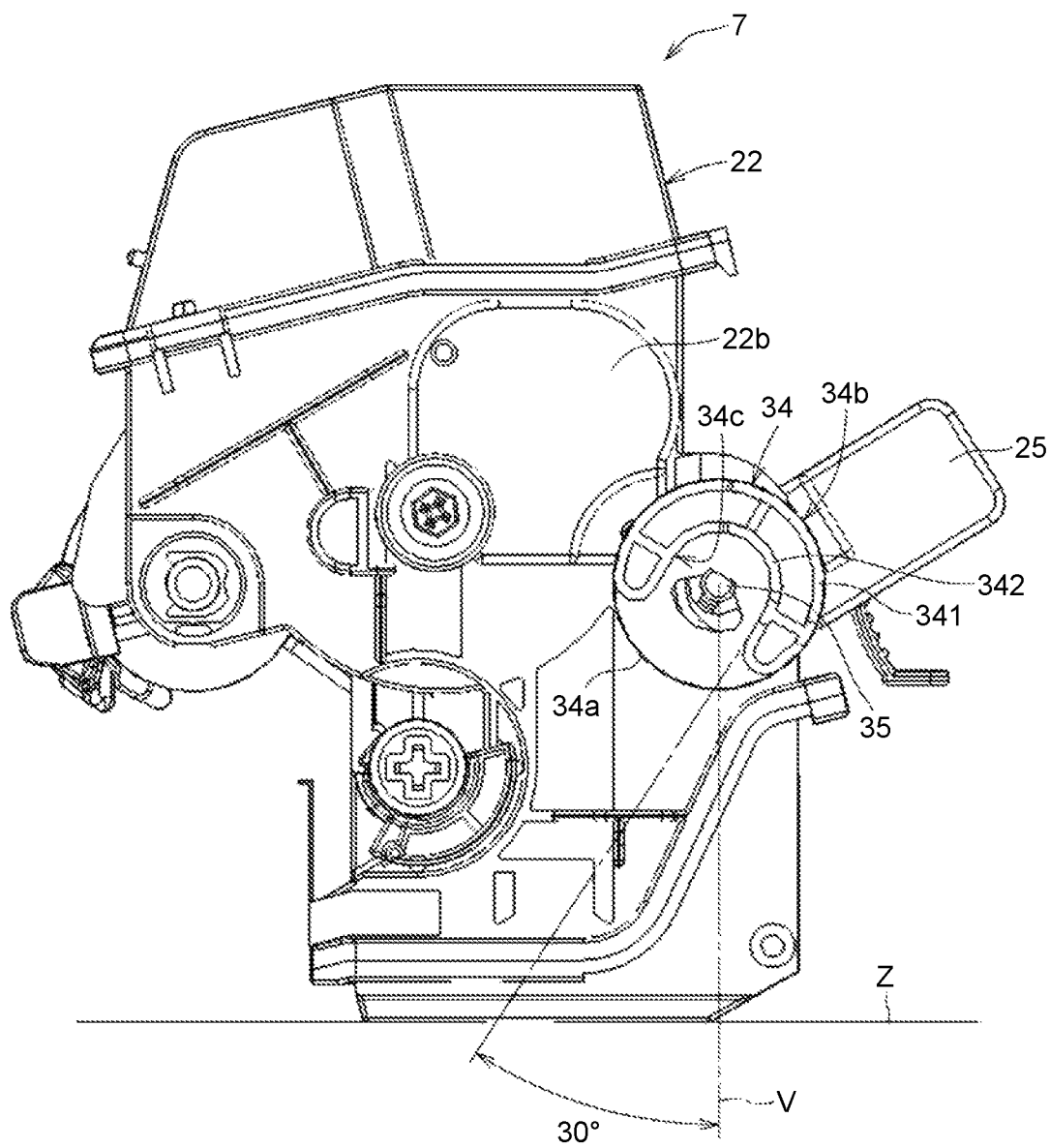
FIG. 9 is a diagram illustrating a configuration of the left-hand side of the toner cartridge.

As illustrated in FIG. 5, in between the shaft 35 and the container body 22, a torsion coil spring 28 is disposed. Because of the torsion coil spring 28, not only the shaft 35 is biased in the clockwise direction with reference to FIG. 9, but also the operating member 26 (the first engaging portion 58) and the second engaging portion 34 that are coupled with the shaft 35 are also biased in the clockwise direction with reference to FIG. 9. Moreover, with the use of a stopper that resists the bias of the torsion coil spring 28, the first engaging portion 58 and the second engaging portion 34 are held at specified orientations. More particularly, in a natural state in which no external force is being applied to the operating member 26, the first engaging portion 58 and the second engaging portion 34 are held in such a way that an opening between both ends of the erected portions 58b and 34b, respectively, are facing in an obliquely downward direction. In the present embodiment, as illustrated in FIG. 9, as far as the direction of the opening of the second engaging portion 34 is concerned; when the toner cartridge 7 is mounted on a mounting surface Z, the inner periphery of the erected portion 58b in the vicinity of the opening faces a direction tilted toward the far side by 30° with respect to a vertical line V corresponding to the horizontal plane. As illustrated in FIG. 14, the direction of the opening of the first engaging portion 58 is also identical to the direction of the opening of the second engaging portion 34, and is tilted toward the far side by 30° with respect to the vertical line V.

Moreover, as illustrated in FIG. 10, on the left-hand side 22b of the container body 22, a waste toner inlet 36 in the form of a square-shaped hole is formed for the purpose of discharging the waste toner into the inside (into the toner collecting unit 9). The waste toner inlet 36 is formed in an arc-like depressed portion 22d that is formed under the positioning projection 31; and has the hole in the upward direction. Around the waste toner inlet 36 is pasted a seal 36a that is formed using a sponge material. On the upper side of the seal 36a, a waste toner inlet shutter 37 is disposed (see FIG. 11) in a pivotable manner so as to slide on the upper surface of the seal 36a.

The waste toner inlet shutter 37 is curved to be able to pivot along the arc-like depressed portion 22d. Moreover, in the state in which the toner cartridge 7 is kept alone, the waste toner inlet shutter 37 is biased by a biasing member 37a, which is a torsion coil spring, in the direction of rotation in which the waste toner inlet 36 always remains closed. The biasing member 37a is placed in between the waste toner inlet shutter 37 and the toner cartridge 7. The rotary shaft of the waste toner inlet shutter 37 is inserted into the torsion coil spring (the biasing member 37a). When the waste toner inlet shutter 37 pivots, it becomes possible to switch between an open state (the state illustrated in FIG. 10) in which the waste toner inlet 36 is open and a closed state (the state illustrated in FIG. 11) in which the waste toner inlet 36 is closed.

Figure 12:
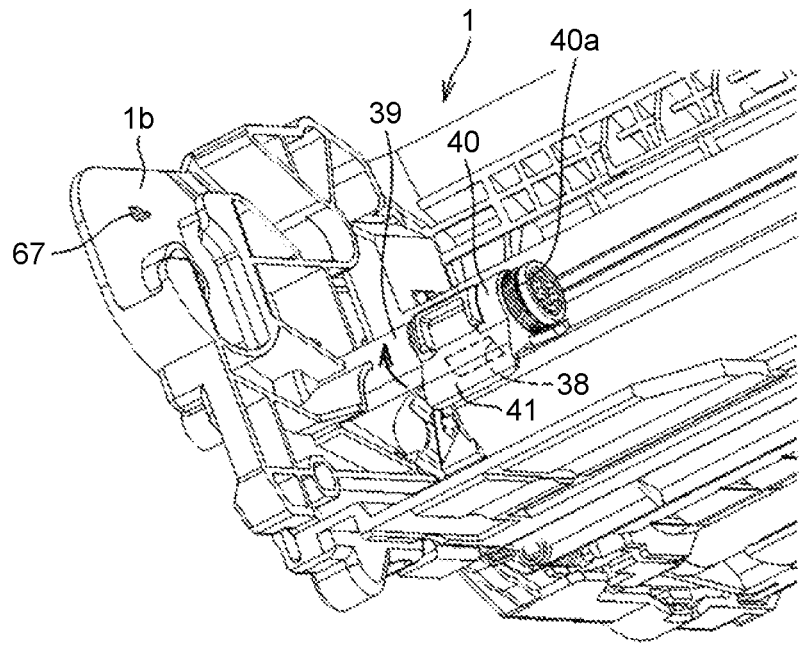
FIG. 12 is a perspective view of the relevant part of the process unit in a state in which a waste toner outlet is closed.

As illustrated in FIG. 12, near the left-hand side 1b of the process unit 1, a waste toner conveying path 39 having a tubular shape is laid in an inwardly protruding manner. At the end of the waste toner conveying path 39 is disposed a waste toner outlet 38, through which the waste toner is discharged and which has an opening in the downward direction. Moreover, to the outer periphery of the end of the waste toner conveying path 39, a waste toner outlet shutter 40 is attached for the purpose of opening and closing the waste toner outlet 38. The waste toner outlet shutter 40 is configured to be able to pivot around the shaft center. Thus, it is possible to switch between an open state (a state illustrated in FIG. 13) in which the waste toner outlet 38 is open and a closed state (a state illustrated in FIG. 12) in which the waste toner outlet 38 is closed.

The waste toner inlet shutter 37 is biased by the biasing member 37a (see FIG. 10), which is made of a torsion coil spring, in the direction of closing the waste toner inlet 36; while the waste toner outlet shutter 40 is biased by a biasing member 40a (see FIG. 12), which is made of a torsion coil spring, in the direction of closing the waste toner outlet 38. Moreover, in the waste toner outlet shutter 40, a convex portion 41 is formed, which the waste toner inlet shutter 37 contacts at the time of attaching the toner cartridge 7 to the process unit 1. Once the waste toner inlet shutter 37 contacts the convex portion 41; the waste toner inlet shutter 37 pivots in the direction in which the waste toner inlet 36 opens (in the direction of an arrow illustrated in FIG. 10), while the waste toner outlet shutter 40 pivots in the direction in which the waste toner outlet 38 opens (in the direction of an arrow illustrated in FIG. 13). Then, in the state in which the toner cartridge 7 is attached to the process unit 1, the waste toner inlet 36 in the open state and the waste toner outlet 38 in the open state are positioned opposite to each other. Thus, in that state, the waste toner inlet 36 and the waste toner outlet 38 are in communication with each other. As a result, the waste toner removed from the outer surface of the photosensitive member 2 can be discharged in the toner cartridge 7 (i.e., in the toner collecting unit 9).

Figure 11:
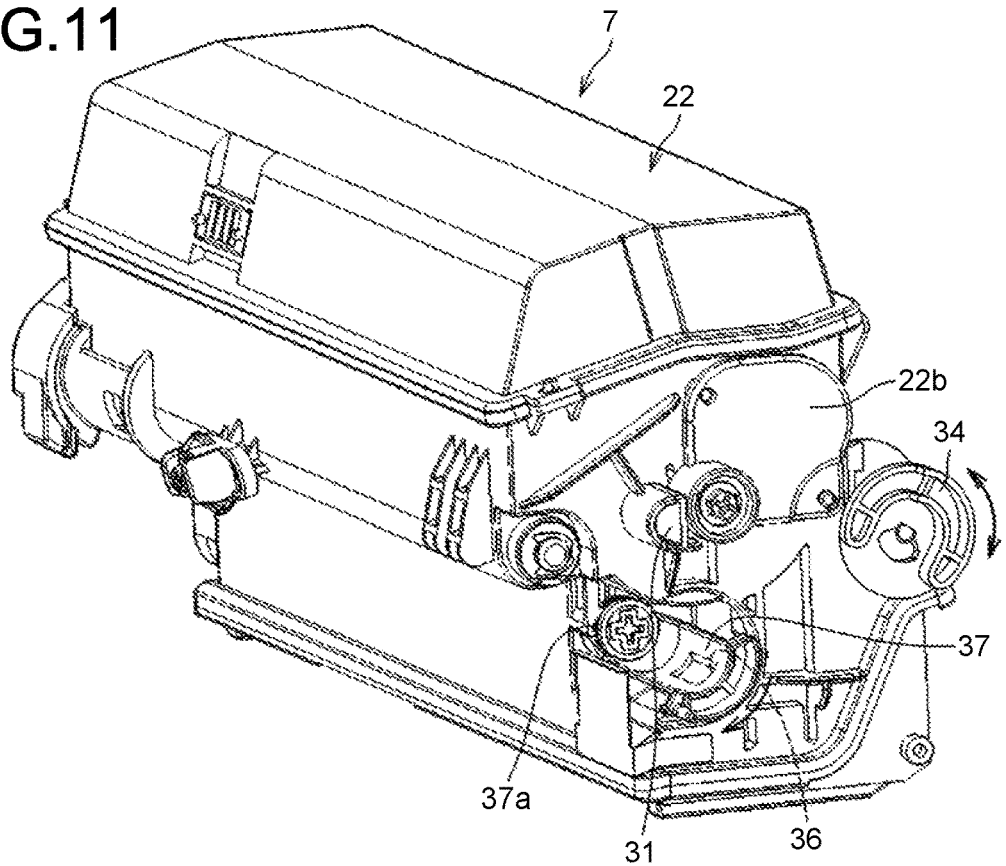
FIG. 11 is a perspective view of the toner cartridge in a state in which the waste toner inlet is closed.

In contrast, in the state in which the toner cartridge 7 is removed from the process unit 1, the contacting between the waste toner inlet shutter 37 and the convex portion 41 is released, and the waste toner inlet shutter 37 and the waste toner outlet shutter 40 pivot in the biasing directions of the respective biasing members (in the directions of arrows illustrated in FIGS. 11 and 12, respectively). As a result, the waste toner inlet 36 and the waste toner outlet 38 are closed, thereby preventing any toner leakage from occurring through the waste toner inlet 36 and the waste toner outlet 38.

Meanwhile, as illustrated in FIG. 14, on a curved surface present near the right-hand side 22a of the container body 22, a replenishment toner outlet 42 in the form of a square-shaped hole is formed for the purpose of discharging the toner that is contained in the toner containing unit 8. The replenishment toner outlet 42 has the hole in the downward direction. Moreover, under the replenishment toner outlet 42, a replenishment toner outlet shutter 43 is disposed along the curved surface (the arc-like surface) of the replenishment toner outlet 42. The replenishment toner outlet shutter 43 can be used in opening and closing the replenishment toner outlet 42. The replenishment toner outlet shutter 43 is disposed in a pivotable manner along the curved surface (the arc-like surface) of the replenishment toner outlet 42 and in a concentric manner to the cylindrical centerline of the positioning projection 29 that is a cylindrical protrusion.

The replenishment toner outlet shutter 43 includes a protrusion 43b that protrudes in the rotary shaft direction of the replenishment toner outlet shutter 43. As illustrated in FIG. 14, a torsion coil spring 43c, which serves as a biasing member, is disposed in between the replenishment toner outlet shutter 43 and the right-hand side 22a, which serves as a cover member for hiding a gear. Moreover, at the end portion of the torsion coil spring 43c is disposed a hook portion that is hooked on the protrusion 43b. Thus, the replenishment toner outlet shutter 43 is biased by the torsion coil spring 43c in the direction of closing the replenishment toner outlet 42.

Figure 15:
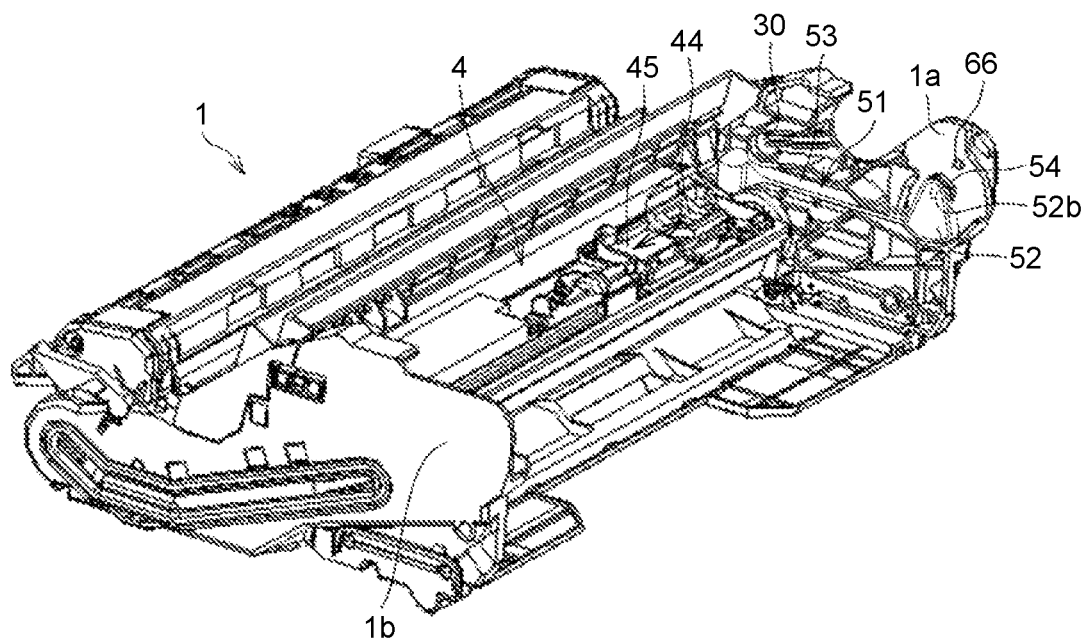
FIG. 15 is a perspective view of the process unit illustrating a position of disposing a linking member.

As illustrated in FIG. 15, near the right-hand side 1a of the developing device 4 of the process unit 1, a replenishment toner inlet 44 having an opening in the upward direction is disposed on the developing device 4 and for the purpose of being poured the replenishment toner. Moreover, in the vicinity of the replenishment toner inlet 44, a replenishment toner inlet shutter 45 is disposed. When the replenishment toner inlet shutter 45 performs a sliding movement from side to side, the replenishment toner inlet 44 is opened and closed.

FIG. 16 is an overall cross-sectional view of the toner cartridge.

As illustrated in FIG. 16, in the toner containing unit 8 of the container body 22, an agitating blade 46 is disposed that serves as an agitating member for agitating the contained toner, and a conveying screw 47 is disposed that serves as a conveying member for conveying the contained toner to the replenishment toner outlet 42. Moreover, in the toner collecting unit 9 of the container body 22, a conveying screw 48 is disposed that serves as a conveying member for conveying the waste toner to the inside of the toner collecting unit 9.

To the conveying screw 47, the conveying screw 48, and the agitating blade 46; a driving force is transmitted from a drive source, which is disposed in the apparatus main body 100, via a drive transmission mechanism. More particularly, in the present embodiment, on the right-hand side 22a of the container body 22, a drive transmission mechanism as a drive transmission unit is disposed that includes a coupling 49 (see FIG. 4) and a plurality of transmission gears that are arranged behind the cover member 22a and mesh with the coupling 49, the conveying screw 47, the conveying screw 48, and the agitating blade 46. When the toner cartridge 7 (the toner container) is mounted in the apparatus main body 100, a drive transmission member engages with the coupling 49. As a result, it becomes possible to perform drive transmission from the drive source disposed in the apparatus main body 100 to the conveying screw 47, the conveying screw 48, and the agitating blade 46.

As illustrated in FIG. 16, the replenishment toner outlet shutter 43 is formed in an arc-like manner along the tubular shape of the replenishment toner outlet 42. On one part of the replenishment toner outlet shutter 43, a hole 43a is formed for the purpose of discharging the toner. Moreover, the replenishment toner outlet shutter 43 is configured to be able to pivot along the outer periphery of the replenishment toner outlet 42.

As illustrated in FIG. 16(a), when the replenishment toner outlet shutter 43 pivots in the counterclockwise direction with reference to FIG. 16(a), the replenishment toner outlet 42 is closed by the replenishment toner outlet shutter 43. On the other hand, as illustrated in FIG. 16(b), when the replenishment toner outlet shutter 43 pivots in the clockwise direction with reference to FIG. 16(b), the hole 43a of the replenishment toner outlet 42 is placed at a position of being in communication with the replenishment toner outlet 42.

Meanwhile, the operating member 26, which has the locking function as described above, doubles as a member for opening and closing the replenishment toner outlet shutter 43. However, the operating member 26 and the replenishment toner outlet shutter 43 are placed at a distance from each other and are not directly connected to each other. That is, when the toner cartridge 7 (the toner container) is kept alone, the operating member 26 and the replenishment toner outlet shutter 43 are in an uncoupled state. Hence, even if the operating member 26 is operated, the opening and closing of the replenishment toner outlet shutter 43 is not performed.

As illustrated in FIG. 15, in the present embodiment, in the process unit 1, a linking member 51 is disposed via which the operating member 26 and the replenishment toner outlet shutter 43 can be switched to a coupled state.

Given below with reference to FIGS. 17 to 20 is the detailed explanation of the configuration of the operating member 26, the replenishment toner outlet shutter 43, and the linking member 51.

In the following explanation, unless particularly necessary, the replenishment toner outlet shutter 43 is simply referred to the "shutter".

Figure 19:
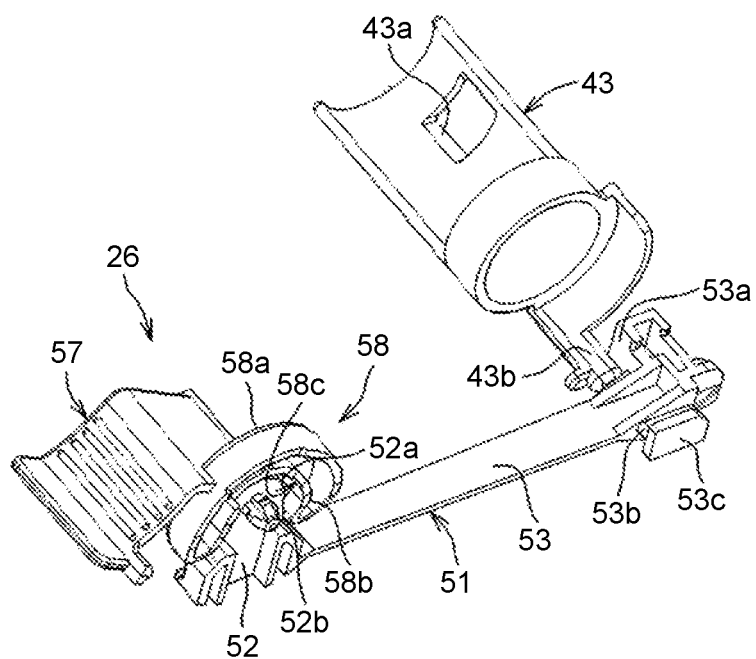
FIG. 19 is a perspective view illustrating a coupled state of an operating member, the shutter, and the linking member when the toner cartridge is attached to a developing device of the process unit.

As illustrated in FIG. 19, the linking member 51 is made of an elongated member. One end of the linking member 51 is engaged with the first engaging portion 58. Similarly, the other end of the linking member 51 is engaged with the shutter 43.

As illustrated in FIG. 19, the protrusion 43b of the shutter 43 serves as an engaging portion that can engage with the linking member 51. The protrusion 43b protrudes in the rotary shaft direction of the shutter 43. As described earlier, the shutter 43 is biased by the torsion coil spring 43c in the direction of closing the replenishment toner outlet 42 (see the arrow illustrated in FIG. 16).

The linking member 51 is made of resin, which is relatively soft and easily elastically-deformable, such as polypropylene (PP), polyethylene (PE), or oil impregnated polyacetal (POM). As illustrated in FIGS. 19 and 20, the linking member 51 is configured with a pivoting portion 52 and a linear portion 53 that is made of a belt member or a string member. The member is flexible in nature and connects the pivoting portion 52.

The pivoting portion 52 that is formed at one end of the linking member 51 includes a convex portion 52a having a gentle mountain-like shape. As illustrated in FIG. 15, the pivoting portion 52 is disposed on the inside of the supporting portion 54 and the supporting portion 54 is disposed on the right-hand side 1a of the process unit 1. The pivoting portion 54 is attached rotatabley with respect to the supporting portion 54 via an axle 52b. When the toner cartridge 7 (the toner container) is attached to the process unit 1, the supporting portion 54 engages with the first engaging surface 58c of the first engaging portion 58, and the convex portion 52a of the pivoting portion 52 is housed in the space inside the first engaging surface 58c. At that time, as illustrated in FIG. 20, the base portions on both sides of the convex portion 52a, which are the parts enclosed by broken line circles respectively, come in contact with the first engaging surface 58c. Herein, contact locations Q1 and Q2 are below the axle 52b.

The linear portion 53 includes a protrusion 53a that serves as a linking-member engaging portion which can engage with or, in other words, which can get hooked on the protrusion 43b of the shutter 43. The protrusion 53a is made of a rib that protrudes in the perpendicular direction to the longitudinal direction of the linear portion 53.

Moreover, in the linear portion 53, a guided portion 53b is disposed that gets inserted in a groove 55. The groove 55 guides to move the guided portion 53b linearly. The groove is served as a guiding portion 55 (see FIG. 17) and formed on the right-hand side 1a of the process unit 1. When the guided portion 53b moves along the guiding portion 55, the linear portion 53 can perform a reciprocating linear movement. Moreover, at the end of the guided portion 53b is disposed a stud 53c that is wider than the groove width of the guiding portion 55 and that prevents the guided portion 53b from coming off from the guiding portion 55. Furthermore, one end of a tension spring 56, which serves as a biasing member, engages with the end of the linear portion 53 that is disposed at the protrusion 53a and is closer to the shutter 43 (see FIGS. 17 and 18). The other end of the tension spring 56 engages with the right-hand side 1a of the process unit 1. Because of the tension spring 56, the linking member 51 is biased toward the far side.

With the configuration of the linking member 51 done in the manner described above, when the pivoting portion 52 pivots in the direction of an arrow C1 illustrated in FIG. 20, the linear portion 53 is pulled and thus moves linearly in the direction illustrated by an arrow D1 illustrated in FIG. 20. On the other hand, when the pivoting portion 52 pivots in the direction of an arrow C2 illustrated in FIG. 20, the linear portion 53 is pressed and thus moves linearly in the direction illustrated by an arrow D2 illustrated in FIG. 20.

Given below is the explanation of the opening/closing operation of the shutter (the replenishment toner outlet shutter).

Figure 17:
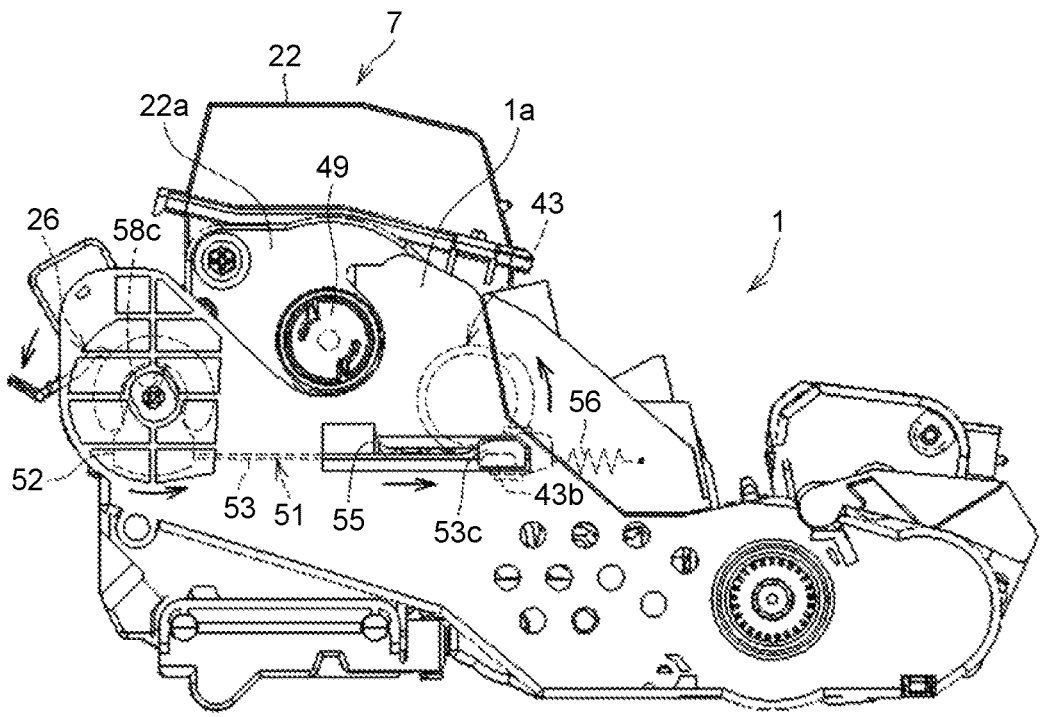
FIG. 17 is a side view of the toner cartridge and the process unit in a state in which the replenishment toner outlet is closed.
Figure 18:
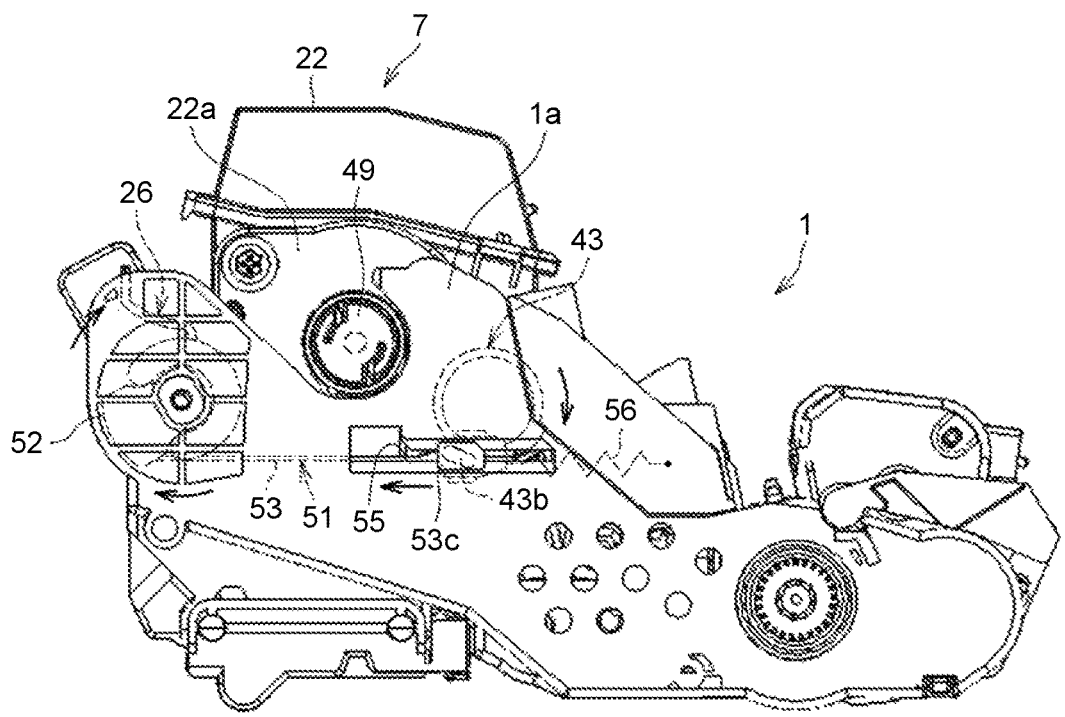
FIG. 18 is a side view of the toner cartridge and the process unit in a state in which the replenishment toner outlet is open.

As illustrated in FIG. 17, in the state in which the toner cartridge 7 (the toner container) is attached to the process unit 1, and the first engaging surface 58c of the operating member 26 is engaged with the pivoting portion 52 of the linking member 51; when the operating member 26 is pivoted toward the near side as illustrated in FIG. 18, the pivoting portion 52 pivots in the clockwise direction with reference to FIG. 18. Along with that, the linear portion 53 gets pulled and moves linearly toward the near side. At that time, the protrusion 53a that is disposed at the end portion of the linear portion 53 gets hooked on the protrusion 43b of the shutter 43 (see FIG. 19). As a result, the shutter 43 pivots in the direction of opening and thus the replenishment toner outlet 42 becomes open.

In the present embodiment, when the replenishment toner outlet 42 becomes open, the replenishment toner inlet 44 (see FIG. 15) in the process unit 1 is already in the open state. For that reason, at the point of time when the replenishment toner outlet 42 becomes open, it is possible to replenish the toner from the toner cartridge 7 (the toner container) to the developing device 4 of the process unit 1.

On the other hand, when the operating member 26 is pivoted toward the far side as illustrated in FIG. 17, the pivoting portion 52 pivots in the counterclockwise direction with reference to FIG. 17. Along with that, the linear portion 53 moves toward the far side due to the tension spring 56. As a result, the shutter 43 is pivoted in the direction of closing and thus the replenishment toner outlet 42 becomes closed.

Meanwhile, in the present embodiment, when the operating member 26 is pivoted toward the near side in order to open the shutter 43 as described above; at the same time, the locking portion 26c1 of the operating member 26 engages with the engaging portion 1c of the process unit 1 and gets locked (see FIG. 6(b)). On the other hand, when the operating member 26 is rotated toward the far side in order to close the shutter 43; at the same time, the engagement between the locking portion 26c1 and the engaging portion 1c is released (see FIG. 6(a)). In this way, in the present embodiment, as a result of operating the operating member 26, the shutter 43 can be opened with the toner cartridge 7 fixing to the process unit 1 and can be closed with the fixed state between the toner cartridge 7 and the process unit 1 released.

Once the locked state is released, it becomes possible to remove the toner cartridge 7 from the process unit 1. When the toner cartridge 7 is removed from the process unit 1, the operating member 26 and the shutter 43 come into the uncoupled state. Thus, in this state, even if an operator casually moves the operating member 26, the shutter 43 does not pivot. In this way, in the state in which the toner cartridge 7 is removed, the operation for opening the shutter 43 cannot be performed. As a result, it becomes possible to prevent toner leakage from occurring through the replenishment toner outlet 42.

Moreover, the linear portion 53 is configured to be able to perform a reciprocating linear movement. Hence, even if the configuration is such that the operating member 26 and the shutter 43 are disposed at the near side and the far side at a distance from each other, these distant components, the operating member 26 and the shutter 43, can be synchronized within a small space in order to link. As compared to a configuration in which, for example, a gear train is used as a linking member, the linear portion 53 which has a smaller number of components than the gear train can achieve a reduction of the installation space of the linking member. With that, it becomes possible to achieve downsizing of the image forming apparatus, and to provide a toner cartridge that can be attached to a downsized image forming apparatus.

Moreover, in the embodiment described above, the linking member 51 has a compact configuration. Hence, particularly in a configuration in which mechanical components are saturated, the installation space for the linking member can be secured while avoiding interference with the other components. For example, as described above in the embodiment, when the coupling 49 that constitutes a drive transmission mechanism is disposed in between the operating member 26 and the shutter 43 which are linked together (see FIG. 17), the linking member 51 needs to be disposed while avoiding interference with the coupling 49. In such a configuration too, according to the embodiment described above, when viewed from a direction perpendicular to the right-hand side 1a of the process unit 1 and the right-hand side 22a of the container body 22, the linking member 51 and the coupling 49 can be disposed in a mutually non-overlapping manner on the sides 1a and 22a that are present on the same right-hand side of the process unit 1 and the container body 22, respectively.

Meanwhile, in the embodiment described above, the explanation is given for an exemplary configuration in which the toner cartridge can detachably mounted in the mounting portion of the process unit. However, alternatively, the configuration can be such that the toner cartridge can be detachably mounted directly in a mounting portion of the apparatus main body. That is, the linking member can be disposed in the apparatus main body instead of the process unit.

Meanwhile, in a configuration in which opening and closing of a shutter is performed using an operating lever; if, after the toner container is removed, an operator such as an operator forgets to operate the operating lever thereby leaving a communication port (a replenishment toner inlet) open, then there is a chance of toner leakage occurring.

In view of such an issue, it is an object of another aspect of the present invention to provide a toner container in which, in tandem with an operation of removing the toner container from a developing device, the replenishment toner inlet is closed; to provide a developing device to which the toner container can be detachably attached; to provide a process cartridge; and to provide an image forming apparatus.

The summary of an invention solving the issue mentioned above is below. A toner container that is detachably attachable to a developing device, the developing device including: an inlet to be poured a toner; an inlet shutter to move between a closing position, at which the inlet is closed, and an opening position, at which the inlet is open; a biasing member to bias the inlet shutter toward the closing position; an engaged portion provided in the inlet shutter; an engaging portion to engage with the engaged portion and to retain the inlet shutter at the opening position against a biasing force of the biasing member; and an engagement releasing portion provided in the inlet shutter and to release an engaging state between the engaged portion and the engaging portion; and the toner container comprising: a contacting surface to contact with the engagement releasing portion and to make the engagement releasing portion release the engaging state.

Given below with reference to FIGS. 22 to 26 is the detailed explanation of the opening/closing mechanism of the replenishment toner inlet shutter 45 (see FIG. 15).

Figure 22:
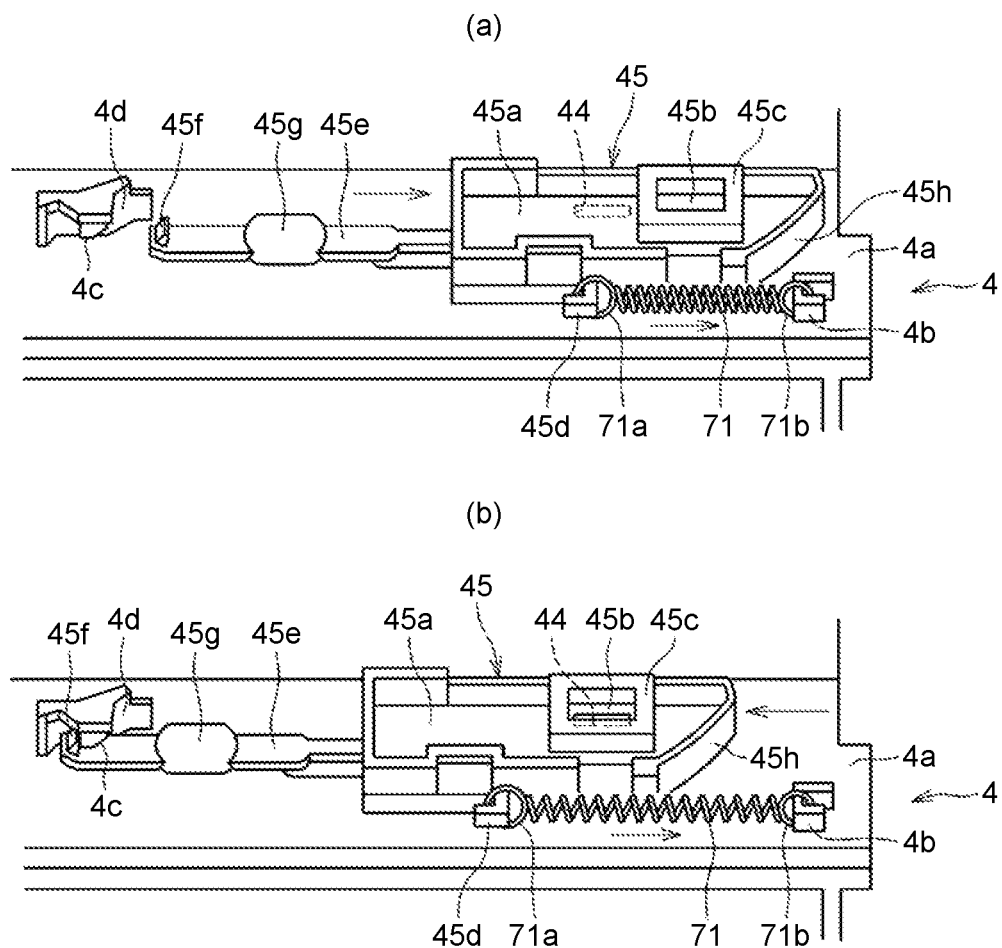
FIG. 22 is a diagram illustrating a configuration of a shutter opening/closing mechanism disposed to the right of the developing device, (a) in FIG. 22 is a diagram illustrating a state in which a shutter main body is positioned at a closing position, and (b) in FIG. 22 is a diagram illustrating a state in which the shutter main body is positioned at an opening position.

FIG. 22 is a diagram illustrating a configuration of a shutter opening/closing mechanism disposed at the developing device 4.

The replenishment toner inlet shutter 45 is configured to able to linearly move between a closing position for closing the replenishment toner inlet 44 (the position illustrated in FIG. 22(*a*)) and an opening position for opening the replenishment toner inlet 44 (the position illustrated in FIG. 22(*b*)). In the present embodiment, the replenishment toner inlet shutter 45 is configured to be able to perform a reciprocating movement in the longitudinal direction of the developing device 4, that is, in the axis direction of a developing roller.

The replenishment toner inlet shutter 45 has a shutter body 45*a* that closes the replenishment toner inlet 44. Moreover, the shutter body 45*a* has a hole 45*b* formed therein. At the opening position illustrated in FIG. 22(*b*), the hole 45*b* formed on the shutter body 45*a* is placed at the position opposite to the replenishment toner inlet 44. Hence, the replenishment toner inlet 44 becomes open. On the other hand, at the closing position illustrated in FIG. 22(*a*), the hole 45*b* formed on the shutter body 45*a* is placed at a position not opposite to the replenishment toner inlet 44. Hence, the replenishment toner inlet 44 becomes closed by the shutter body 45*a*. Meanwhile, on the rim of the hole 45*b* is pasted a seal 45*c* that is made of a sponge material. When the toner cartridge 7 (the toner container) is attached to the developing device 4 and when the replenishment toner outlet shutter 43 becomes open, the seal 45*c* adheres tightly to the rim of the hole 43*a* (see FIG. 14) formed on the replenishment toner outlet shutter 43, and prevents the toner from leaking out.

Moreover, in the shutter body 45*a*, a retainer 45*d* is so formed that a hook 71*a* at one of a coil spring 71, which serves as a biasing member, is hooked on the retainer 45*d*. A hook 71*b* at the other end of the coil spring 71 is hooked on a retainer 4*b* formed on a casing 4*a* of the developing device 4 in the process unit 1. Due to the biasing force of the coil spring 71, the shutter body 45*a* is always biased toward the side of the closing position (toward the right-hand side with reference to FIG. 22).

Furthermore, in the shutter body 45*a* is disposed an elongated portion 45*e* as an extending portion that extends in the direction of movement toward the opening position (toward the left-hand side with reference to FIG. 22). On the upper surface at the end of the elongated portion 45*e*, an engaged portion 45*f* that has a hook protruding upward is disposed. Corresponding to the engaged portion 45*f*, in the casing 4*a* of the developing device 4, an engaging portion 4*c* is disposed that is a protrusion which can get engaged with the engaged portion 45*f* Herein, the engaging portion 4*c* protrudes downward from the inner surface of an engaging member 4*d* which is a case and is disposed in an upwardly rising manner from the casing 4*a*.

As illustrated in FIG. 22(*b*), in the engaging state of the engaging portion 4*c* and the engaged portion 45*f*, the shutter body 45*a* is held at the opening position against the biasing force of the coil spring 71.

Figure 23:
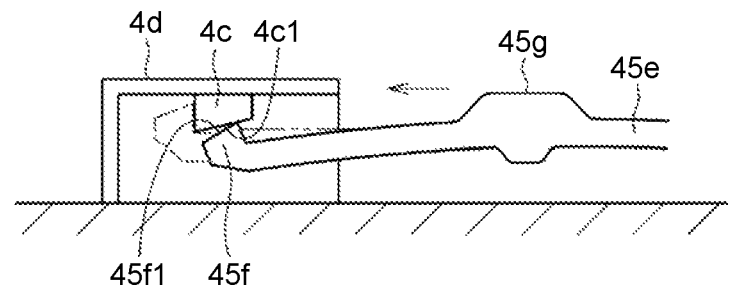
FIG. 23 is a diagram illustrating a locking mechanism of a replenishment toner entry shutter.

As illustrated in FIG. 23, accompanying the movement of the shutter body 45*a* toward the opening position, the engaged portion 45*f* abuts against the engaging portion 4*c* and makes a sliding contact with the engaging portion 4*c*. Consequently, the engaging portion 4*c* undergoes elastic deformation in such a way that the elongated portion 45*e* bends downward. As a result, the engaged portion 45*f* goes over the engaging portion 4*c*. At the point of time of when the engaged portion 45*f* goes over the engaging portion 4*c*, the elongated portion 45*e* returns upward. With that, the engaged portion 45*f* and the engaging portion 4*c* get engaged. Herein, in order to make it easier for the engaged portion 45*f* to go over the engaging portion 4*c*, the contact-making portion of the engaging portion 4*c* has a tilted surface 4*c*1 formed thereon, while the contact-making portion of the engaged portion 45*f* has a tilted surface 45*f*1 formed thereon.

Meanwhile, alternatively, the engaging portion 4*c* may be disposed in the toner cartridge 7 for the purpose of retaining the shutter body 45*a*. However, as described in the present embodiment, by disposing the engaging portion 4*c* in the casing 4*a* of the developing device 4, the toner cartridge 7 can be spared from being applied with the load generated at the time of retaining the shutter body 45*a*. As a result, it becomes possible to maintain a stable mounted state of the toner cartridge 7 with respect to the developing device 4.

Moreover, as illustrated in FIG. 22, in the in-between portion in the longitudinal direction of the elongated portion 45*e*, an engagement releasing portion 45*g* is disposed for the purpose of releasing the engaging state of the engaging portion 4*c* and the engaged portion 45*f* in cooperation with the toner cartridge 7 (described later). The engagement releasing portion 45*g* is a curved surface that protrudes in the upward direction. In other words, the portion 45*g* is a bulge on the elongated portion 45*e*.

Furthermore, in the shutter body 45*a* is disposed a pressed portion 45*h* that is a side part of the shutter body 45*a* and is used to generate a force for moving the shutter body 45*a* to the opening position in cooperation with attaching movement of the toner cartridge 7 (described later). The pressed portion 45*h* is a tilted surface that is tilted with respect to the direction of movement of the shutter body 45*a*.

Figure 24:
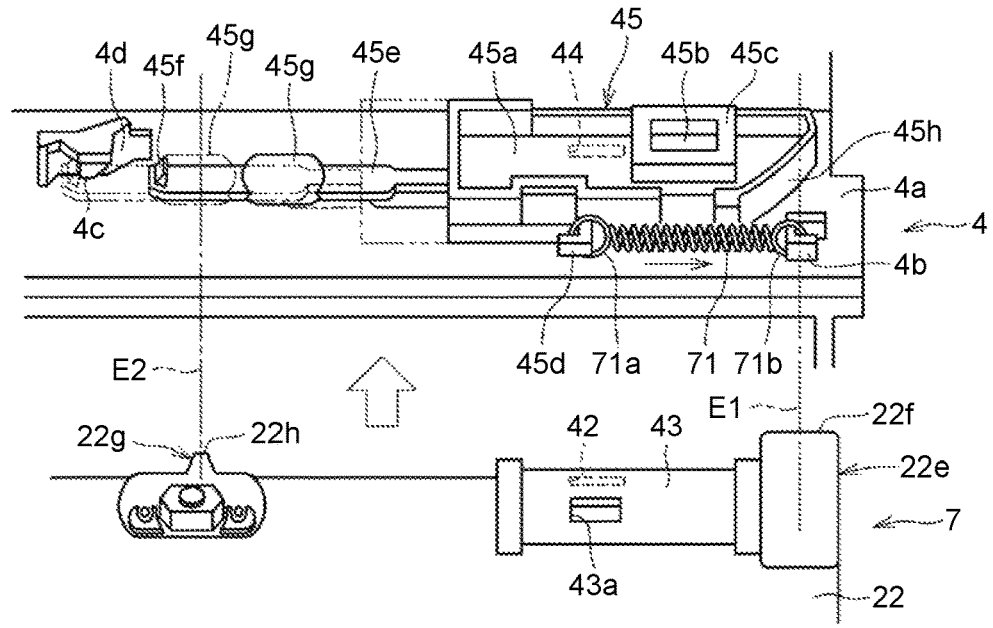
FIG. 24 is a diagram illustrating a configuration of the right-hand side of the developing device and the toner cartridge.

FIG. 24 is a diagram illustrating a configuration of the right-hand side of the developing device 4 and the toner cartridge 7.

As illustrated in FIG. 24, on the right-hand side of the container body 22 of the toner cartridge 7, the replenishment toner outlet 42 is disposed along with the replenishment toner outlet shutter 43 that has the shape of a curved surface (an arc surface) for opening and closing the replenishment toner outlet 42. To further right-hand side than the replenishment toner outlet 42 is disposed a pressing portion 22*e* that is a protrusion in the radially outside direction more than the replenishment toner outlet shutter 43. In other words the pressing portion 22*e* is a bulge on the replenishment toner outlet shutter 43. The pressing portion 22*e* has a pressing surface 22*f* for pressing the pressed portion 45*h* of the shutter body 45*a*. At the time of attaching the toner cartridge 7, the pressing surface 22*f* abuts against the pressed portion 45*h*. Then, in the state in which the shutter body 45*a* is placed at the closing position as illustrated in FIG. 24, the pressed portion 45*h* of the shutter body 45*a* is placed on a pathway E1 followed by the pressing surface 22*f* during the mounting operation of the toner cartridge 7. In other words, the pathway E1 is configured to go through the position of the pressed portion 45*h* in the state in which the shutter body 45*a* is placed at the closing position. Then, the contacting of the pressing surface 22*f* and the pressed portion 45*h* generates a force on the pressed portion 45*h* to move the shutter body 45*a* to the opening position (to the left-hand side in FIG. 24) against the biasing force of the coil spring 71.

Figure 25:
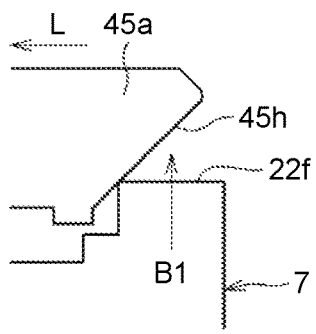
FIG. 25 is a diagram illustrating a state in which a pressing surface of the toner cartridge is abutted against a pressed portion of the shutter main body.

In the present embodiment, as illustrated in FIG. 25, a mounting direction B1 of the toner cartridge 7 is different than a direction of movement L of the shutter body 45*a* toward the opening position. Hence, by forming the pressed portion 45*h* as a tilted surface, the contact force of the pressing surface 22*f* can be converted into a force for moving the shutter body 45*a* toward the opening position. More particularly, the pressed portion 45*h* is tilted to face a direction that is opposite to the mounting direction B1 of the toner cartridge 7 with respect to the developing device 4 as well as opposite to the direction of movement L of the shutter body 45a toward the opening position (in FIG. 25, tilted to face the right-hand downward direction).

Meanwhile, as illustrated in FIG. 24, in the container body 22 of the toner cartridge 7, a protrusion 22g that protrudes downward is disposed on the left-hand side of the replenishment toner outlet shutter 43. The protrusion 22g has a contacting surface 22h for contacting with the engagement releasing portion 45g. In the state in which the shutter body 45a is placed at the closing position as illustrated in FIG. 24, the engagement releasing portion 45g is not placed on a pathway E2 followed by the contacting surface 22h during the mounting operation of the toner cartridge 7. However, in the state in which the shutter body 45a is placed at the opening position illustrated by a two-dot chain line in FIG. 24, the engagement releasing portion 45g is placed on the pathway E2 followed by the contacting surface 22h. In other words, the pathway E2 is configured to go through the position of the engagement releasing portion 45g in the state in which the shutter body 45a is placed at the opening position.

Figure 26:
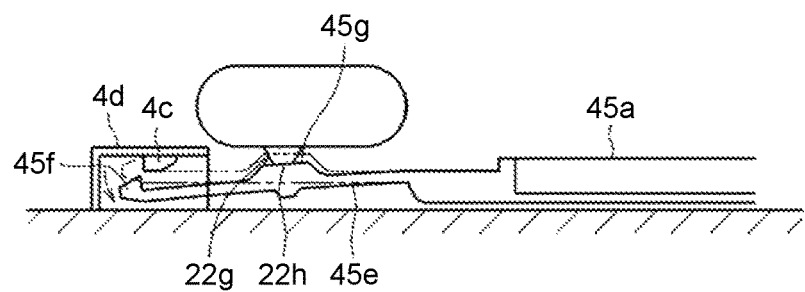
FIG. 26 is a diagram illustrating a lock releasing mechanism of the replenishment toner entry shutter.

As illustrated in FIG. 26, when the contacting surface 22h of the protrusion 22g contacts the engagement releasing portion 45g, it results in pushing down the engagement releasing portion 45g by the protrusion 22g. Thus, the engagement releasing portion 45g undergoes elastic deformation in such a way that the elongated portion 45e bends downward. As a result, the engaging state between the engaged portion 45f and the engaging portion 4c is released. In other words, the contacting surface 22h contacts with the engagement releasing portion 45g and makes the engagement releasing portion 45g release the engaging state.

Given below is the explanation about the opening/closing operation of the replenishment toner inlet shutter 45.

Figure 27:
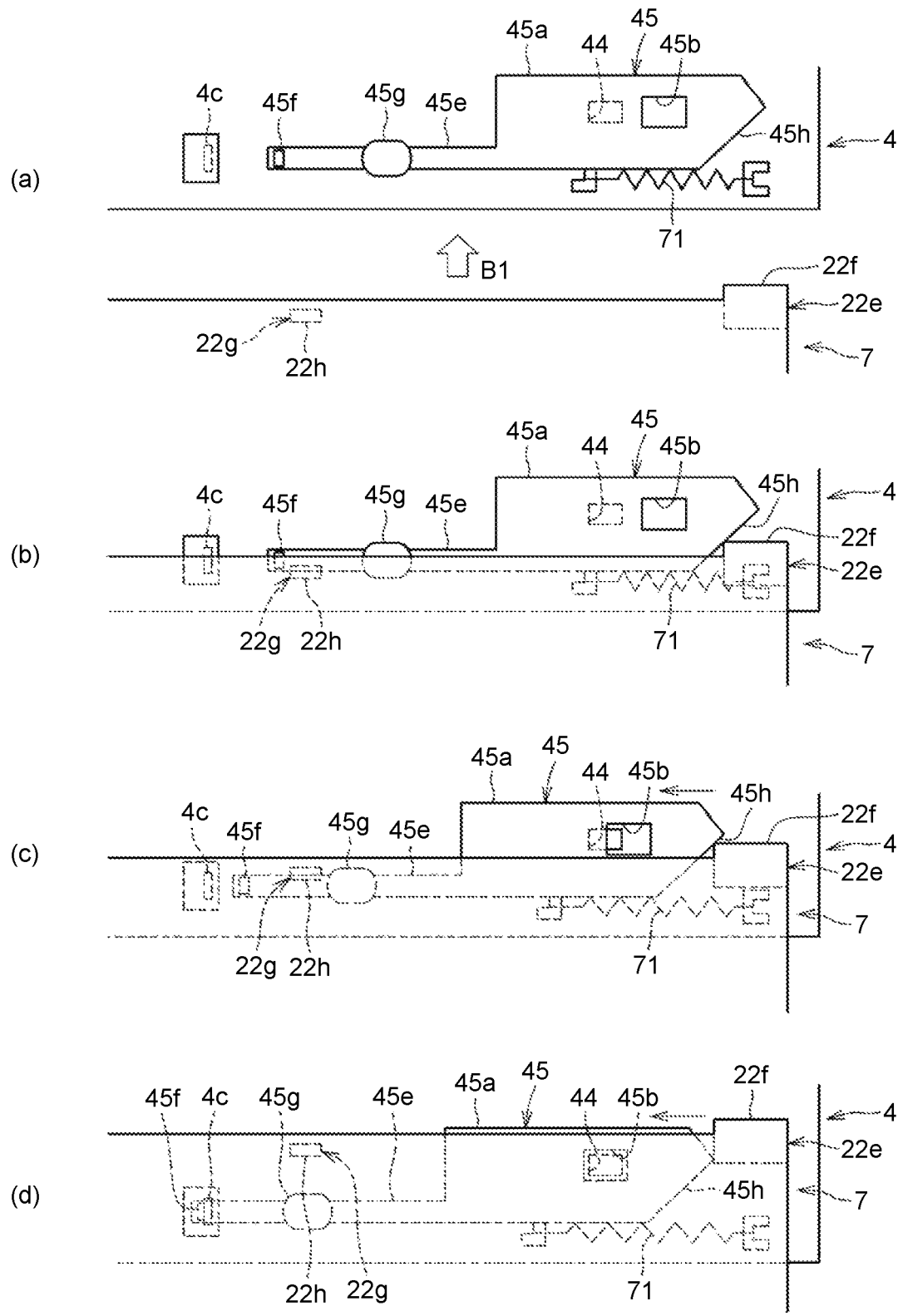
FIG. 27 is a diagram illustrating an opening operation of the replenishment toner entry shutter.

Firstly, explained below with reference to FIG. 27 is the opening operation of the replenishment toner inlet shutter 45.

As illustrated in FIG. 27(a), in the state in which the toner cartridge 7 is not mounted in the mounting portion of the developing device 4, the replenishment toner inlet shutter 45 remains at the closing position, and the replenishment toner inlet 44 is closed by the shutter body 45a. In that state, if the toner cartridge 7 is inserted in the mounting direction B1; then, as illustrated in FIG. 27(b), the pressing surface 22f of the toner cartridge 7 contacts the pressed portion 45h of the shutter body 45a. Then, as illustrated in FIG. 27(c), due to the pressing force exerted on the toner cartridge 7 in the mounting direction B1, the pressed portion 45h gets pressed via the pressing surface 22f, and the replenishment toner inlet shutter 45 starts moving toward the opening position against the biasing force of the coil spring 71. In other words, the toner cartridge 7 (the toner container) further includes the pressing surface 22f to contact the pressed portion 45h provided in the replenishment toner inlet shutter 45, and to move the shutter to the opening position against a biasing force of the coil spring 71 (the biasing member).

If the toner cartridge is further inserted in the mounting direction B1; then, as illustrated in FIG. 27(d), the engaged portion 45f present at the end of the elongated portion 45e gets engaged with the engaging portion 4c. As a result, the replenishment toner inlet shutter 45 gets locked at the opening position. At that time, the hole 45b formed on the shutter body 45a corresponds to the replenishment toner inlet 44 and the replenishment toner inlet 44 becomes open. Meanwhile, as the replenishment toner inlet shutter 45 moves to the opening position, the contacting surface 22f of the toner cartridge 7 and the engagement releasing portion 45g of the replenishment toner inlet shutter 45 pass by each other without contacting. With that, it is ensured that the replenishment toner inlet shutter 45 moves smoothly to the opening position.

Figure 28:
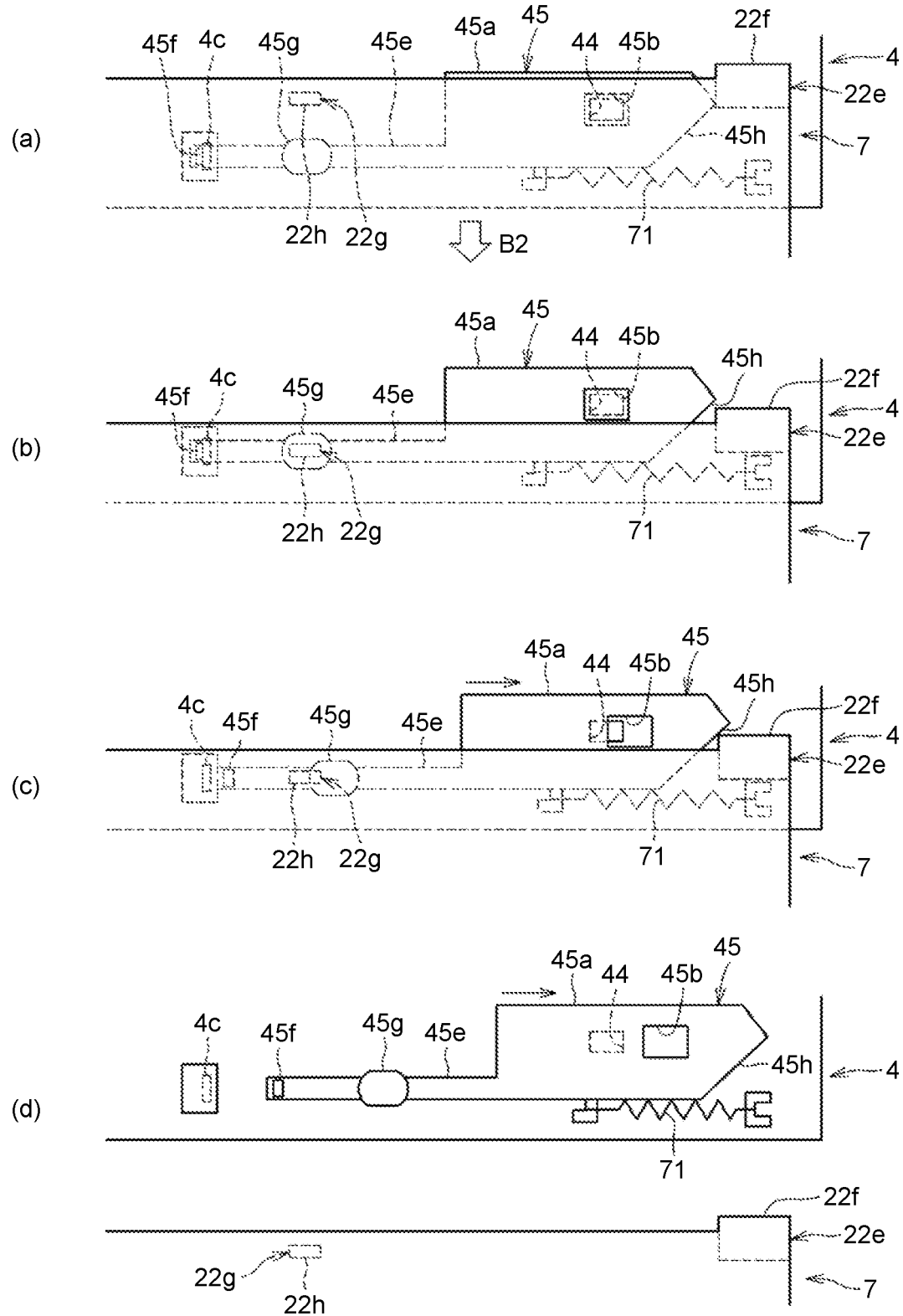
FIG. 28 is a diagram illustrating a closing operation of the replenishment toner entry shutter.

Explained below with reference to FIG. 28 is the closing operation of the replenishment toner inlet shutter 45.

As illustrated in FIG. 28(a), after the toner cartridge 7 is attached to the developing device 4 and after the replenishment toner inlet shutter 45 is retained at the opening position, if the toner cartridge 7 is moved in a direction of removal B2; then, as illustrated in FIG. 28(b), the contacting surface 22h of the toner cartridge 7 contacts the engagement releasing portion 45g of the replenishment toner inlet shutter 45. Once the contacting surface 22h contacts the engagement releasing portion 45g, it results in pushing down the engagement releasing position by the contacting surface 22h. Consequently, the elongated portion 45e bends downward (see FIG. 26), and the engaging state between the engaged portion 45f and the engaging portion 4c is released.

As illustrated in FIG. 28(c), once the engaging state between the engaged portion 45f and the engaging portion 4c is released, the replenishment toner inlet shutter 45 gets pulled toward the closing position due to the biasing force of the coil spring 71. Thus, as illustrated in FIG. 28(d), when the toner cartridge 7 is removed from the developing device 4, the replenishment toner inlet shutter 45 is placed at the closing position and the replenishment toner inlet 44 becomes closed by the shutter body 45a.

In this configuration, in conjunction with attaching the toner cartridge the developing device or removing the toner cartridge from the developing device, the shutter of the developing device (i.e., the toner replenishment inlet shutter) can be opened or closed. That enables achieving excellent operability of the shutter. Moreover, it becomes possible to prevent a situation in which an operator forgets to open the shutter or forgets to close the shutter.

Meanwhile, it is not always the case that a toner cartridge, which functions as a toner container, is attached to an image-forming-apparatus main body at a correct position. That is, there are times when the toner cartridge is attached to an image-forming-apparatus main body in a twisted state or in a tilted state. In the state of the poor attachment; if the operating lever is operational, then there may occur toner scattering or toner leakage in the image forming apparatus.

In view of such an issue, it is an object of still another aspect of the present invention to provide a toner container in which, even if the toner container is poorly attached to a developing device, the toner is reliably prevented from leaking; as well as to provide a process cartridge and an image forming apparatus.

The summary of an invention solving the issue mentioned above is below. A toner container including: a container body to contain a toner and that is attachable to and detachable from a developing device; an outlet to discharge the toner contained in the container body; an outlet shutter to open and close the outlet; and an operating member to move the shutter according a direction of rotation thereof, the operating member being attached in a rotatable manner to the container body and that, wherein the operating member includes an engaging portion that is rotatable in conjunction with rotation of the operating member and that is rotatably supported by engagement with a supporting portion provided in the developing device.

Given below with reference to FIGS. 29 to 41 is the explanation of a characteristic configuration according to the present invention.

In the present invention, the shaft 35 that is used to pivot the operating member 26 is supported by the toner cartridge 7 (the toner container). And the shaft 35 is also supported at the sides of the process unit 1 when the toner cartridge 7 (the toner container) is attached to the process unit 1. For the purpose of achieving such support, the engaging portions 58 and 34 are disposed at both ends in the axis direction of the shaft 35; and the supporting portions 54 and 33 are disposed on the surfaces on both sides of the process unit 1. Thus, the supporting portions 54 and 33 engage with the engaging portions 58 and 34, respectively.

Figure 30:
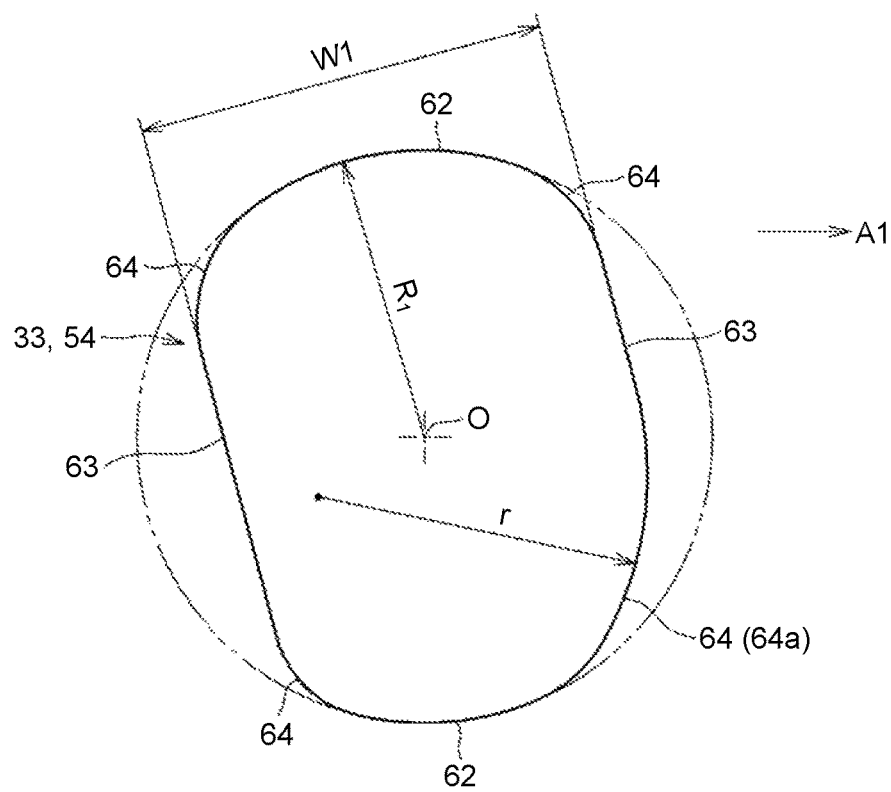
FIG. 30 is a cross-sectional view of the contour of supporting portions.

FIG. 30 is an enlarged view of a cross-sectional contour of the outer periphery of each of the supporting portions 54 and 33 that are formed on the sides 1a and 1b, respectively, of the process unit 1. The outer periphery of both supporting portions 33 and 54 is identical in shape, which is formed by removing two parts which are opposite to each other in the radial-direction of a cylindrical surface. More particularly, the outer periphery of each of the supporting portions 33 and 54 includes two arc-like inner surfaces 62 having a radius R1, connecting surfaces 63 that connect arc-like inner surfaces 62 in an inside of an imaginary circle (illustrated by a two-dot chain line) having the same radius as the arc-like inner surfaces 62, and arc-like chamfers 64 that smoothly connect each arc-like inner surface 62 with the neighboring connecting surfaces 63.

As illustrated in FIGS. 30 and 36A, the radius R1 of an arc-like engaging surface 34c2 is equal to a radius of curvature R2 of the first engaging surface 58c of the first engaging portion 58 and the arc-like engaging surface 34c2 of the second engaging surface 34c of the second engaging portion 34 (i.e., R1=R2). Moreover, in this embodiment, the connecting surfaces 63 are flat surfaces parallel to each other, and a width W1 between the two connecting surfaces 63 is smaller than a width W2 of the first engaging portion 58c and the second engaging portion 34c at the opening-side end portions (i.e., W1<W2). Of the chamfers 64 formed on the outer periphery of each of the supporting portions 33 and 54, a chamfer 64a positioned on the far side (in the direction A1 illustrated in FIG. 30) and on the lower side has a greater radius of curvature r as compared to the radii of curvature of the other three chamfers. The chamfer 64a functions as a clearance retaining portion for avoiding interference with the first engaging surface 58c or the second engaging surface 34c that rotates in the manner described later. Meanwhile, regarding the connecting surfaces 63, aside from forming them as flat surfaces, it is also possible to form them as arc-like surfaces having a greater radius of curvature as compared to the radius of curvature R1 of the arc-like engaging surface 34c2. Moreover, the chamfers 64, including the clearance retaining portion 64a, can be formed with two or more arc-like surfaces having different radii of curvature.

The connecting surfaces 63 of each of the supporting portions 33 and 54 have the upper parts of themselves tilted toward the near side. Herein, the angle of tilt of the connecting surfaces 63 is about the same as the angle of tilt of the first engaging surface 58c (see FIG. 9) and the angle of tilt of the second engaging surface 34c (see FIG. 14) in the state in which the toner cartridge 7 is removed from the process unit 1. In other words, the state is that the toner cartridge 7 is kept alone.

Figure 13:
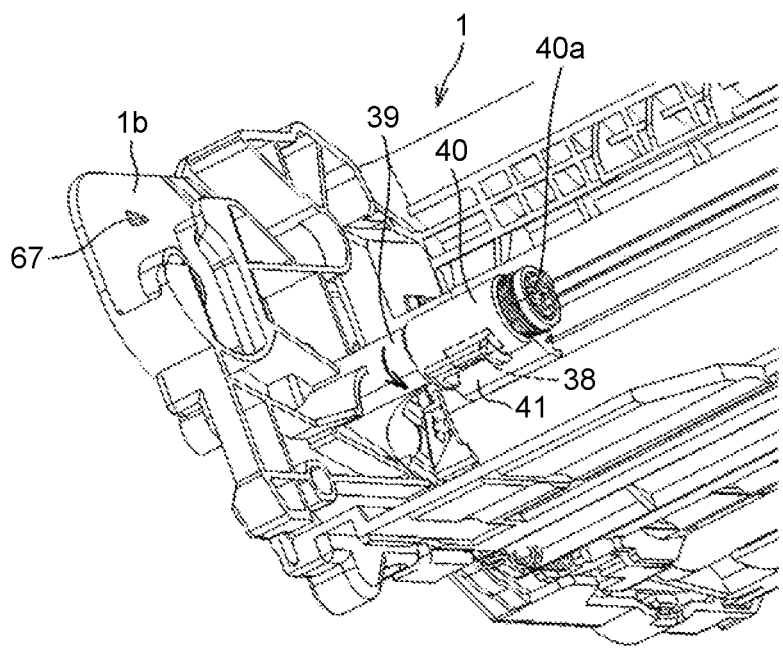
FIG. 13 is a perspective view of the relevant part of the process unit in a state in which the waste toner outlet is opened.

As illustrated in FIGS. 6(b), 7(a), 15, and 29; the right-hand side 1a of the process unit 1 has a protrusion 66 disposed thereon. In the state in which the toner cartridge 7 is attached to the process unit 1, the protrusion 66 is arranged at such a position that the outer periphery of the outer wall 581 of the first engaging portion 58 is restrained from the radially outside. Moreover, as illustrated in FIGS. 4, 12, and 13; the left-hand side 1b of the process unit 1 has a protrusion 67 disposed thereon in a similar manner to the protrusion 66. In the state in which the toner cartridge 7 is attached to the process unit 1, the outer periphery of the outer wall 341 of the second engaging portion 34 (see FIG. 9) is restrained by the protrusion 67.

Given below is the detailed explanation of a configuration of the first engaging portion 58 and the second engaging portion 34.

The outer wall 581 that is formed in the first engaging portion 58 is formed as an arc-like surface. The center of the arc-like surface corresponds to the center of rotation of the shaft 35 (the axle 52b). As illustrated in FIG. 36(a), the first engaging surface 58c serving as the inner periphery of the inner wall 582 includes the arc-like engaging surface 34c2 (a curved engaging surface) having the same center as the center of the outer periphery of the outer wall 581. Of the arc-like engaging surface 34c2, both ends in the circumferential direction are formed as flat surfaces extending in the tangential direction. In those portions, a non-arc-like engaging surface 34c1 (a flat engaging surface) is formed as a rotation restricting portion. In other words, the non-arc-like engaging surface 34c1 is a rotation restricting wall.

Figure 31:
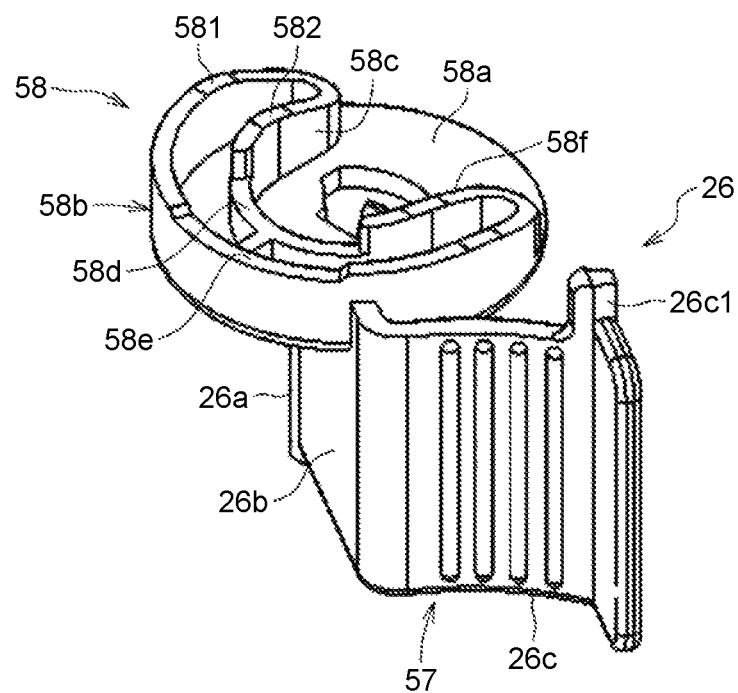
FIG. 31 is a perspective view of the operating member.

As illustrated in FIG. 31, on the tops of the outer wall 581 and the inner wall 582 of the first engaging portion 34, notches 58e and 58d are respectively formed in some of the area in the circumferential direction. The notches 58d and 58e are formed at such positions that, while attaching the toner cartridge 7 to the process unit 1, the protrusion 66 disposed on the right-hand side 1a of the process unit 1 passes through the notches 58d and 58e. In the present embodiment, the notches 58e and 58d are formed on the arc-like tops of the outer wall 581 and the inner wall 582, respectively, of the first engaging portion.

The notch 58d formed on the inner wall 582 has a greater depth than the depth of the notch 58e formed on the outer wall 581. And a part of the top of the inner wall 582 in which the notch 58d is formed forms a low step portion. The low step portion is closest to the baseplate portion 58a from among the top of the outer wall 581 and the top of the inner wall 582. The low step portion has the lower height than the heights that the outer wall 581 and the inner wall 582 have respectively. Moreover, a part of the top of the outer wall 582 in which the notch 58e is formed forms a middle step portion that is next closest to the baseplate portion 58a. Except for the low step portion 58d and the middle step portion 58e, the top of the outer wall 581 and the top of the inner wall 582 constitute a high step portion 58f that is most separated from the baseplate portion 58a. Meanwhile, regarding the outer wall 581 and the inner wall 582, both end portions in the circumferential direction can be formed to be tapered surfaces decreasing its height toward the end side.

The low step portion 58d is set to have such a height that, while attaching the toner cartridge 7 to the process unit 1, the protrusion 66 formed on the right-hand side 1a of the process unit 1 can pass through without making contact with the top of the low step portion 58e. In contrast, the middle step portion 58e is set to have such a height that, while attaching the toner cartridge 7 to the process unit 1, the protrusion 66 interferes with the top of the middle step portion 58e. Thus, due to the passing of the protrusion 66, the middle step portion 58e undergoes elastic deformation.

Given below is the detailed explanation of the second engaging portion 34.

As illustrated in FIG. 9, the outer wall 341 formed in the second engaging portion 34 is formed as an arc-like surface in such a way that the center of rotation of the shaft 35 serves as the center of the entire outer periphery of the outer wall 341. The second engaging surface 34c serving as the inner periphery of the inner wall 342 is identical to the first engaging surface 58c in view of the shaft direction. The second engaging surface 34c includes an arc-like engaging surface (a curved engaging surface) having the same center as the center of the outer periphery of the outer wall 341, and both ends of the second engaging surface 34c forming flat non-arc-like engaging surfaces (flat engaging surfaces).

Figure 32:
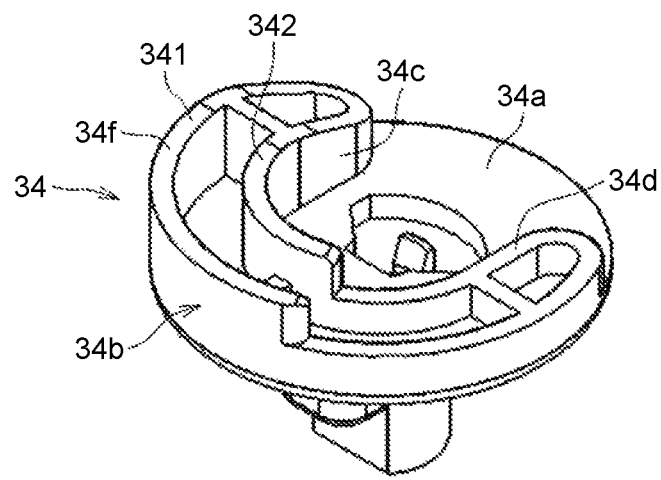
FIG. 32 is a perspective view of a second engaging portion.
Figure 36:
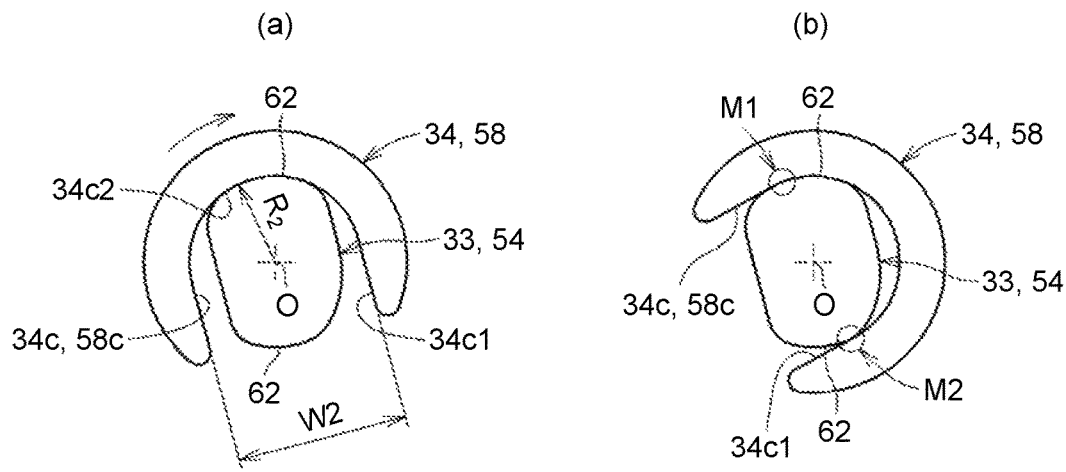
FIG. 36 is a diagram illustrating a positional relationship between the engaging portions and the supporting portions in a state of normal attachment, (a) in FIG. 36 is a cross-sectional view of the preliminarily-held state, and (b) in FIG. 36 is a cross-sectional view of the locked state after an operation of the operating member.
Figure 37:
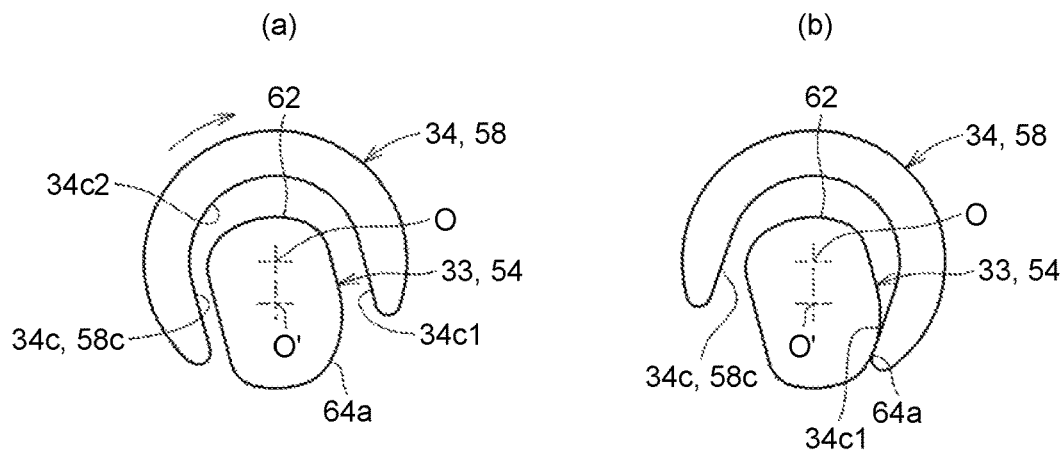
FIG. 37 is a diagram illustrating a positional relationship between the engaging portions and the supporting portions in a state of poor attachment, (a) in FIG. 37 is a cross-sectional view of the preliminarily-held state, and (b) in FIG. 37 is a cross-sectional view of the locked state after an operation of the operating member.

As illustrated in FIG. 32, on the tops of the outer wall 341 and the inner wall 342 of the second engaging portion 34, notches 34d are formed in some of the area in the circumferential direction. Herein, in an identical manner to the first engaging portion 58, the notches 34d are set at such positions that, while attaching the toner cartridge to the process unit 1, the protrusion 67 formed on the left-hand side 1b of the process unit 1 passes through the notches 34d. In the first engaging portion 58, the notches 58e and 58d are formed in a half-arc-like area in the circumferential direction of the outer wall 581 and the inner wall 582, respectively. However, in the second engaging portion 34, the notch 34d is formed over the entire area starting from the half-arc-like area of one of the outer wall 341 and the inner wall 342 up to the end of the other of the outer wall 341 and the inner wall 342.

The notches 34d that are formed on the outer wall 341 and the inner wall 342 of the second engaging portion 34 have the same height. Thus, without constituting a middle step portion that interferes with the protrusion 67, each notch 34d constitutes a low step portion that does not interfere with the protrusion 67. Except for the low step portions 34d, the top of the outer wall 581 and the top of the inner wall 582 constitute a high step portion 34f that is most separated from the baseplate portion 58a. Meanwhile, regarding the outer wall 341 and the inner wall 342, the area up to the other ends can be formed to be tapered surfaces decreasing its height toward the end.

Given below is the explanation of the operations performed at the time of attaching the toner cartridge 7 to the process unit 1.

While attaching to the process unit 1, the toner cartridge 7 is brought down from an obliquely upward direction by the operator. At that time, as illustrated in FIG. 36(a), the supporting portions 54 and 33 have almost or identically the same tilt as the tilt of the first engaging surface 58c and the second engaging surface 34c, respectively. Hence, the supporting portions 54 and 33 can be smoothly guided in the first engaging surface 58c and the second engaging surface 34c, respectively. Moreover, in the supporting portions 54 and 33, the width W1 between the two connecting surfaces 63 is smaller than the width W2 of the first engaging portion 58c and the second engaging portion 34c at the opening-side end portions. Hence, even if the direction of bringing down the toner cartridge 7 is little out of alignment, the supporting portions 54 and 33 can be reliably guided in the first engaging surface 58c and the second engaging surface 34c, respectively.

Once the toner cartridge 7 is pressed up to a specified position in the process unit 1; then, as illustrated in FIG. 36(a), the arc-like inner surfaces 62 of the upper part of each of the supporting portions 54 and 33 engage with the first engaging surface 58c and the second engaging surface 34c, respectively. In that state, as illustrated in FIGS. 33(a) and 33(b), even before rotating the operating member 26 forward for the locking purpose, the protrusions 66 and 67 contact and restrain the outer periphery of the first engaging portion 58 (i.e., the outer periphery of the outer wall 581) from above. For that reason, the toner cartridge 7 remains in a preliminarily-held state in which it is restricted from coming off in the upward direction. Because of the preliminarily-held state of the toner cartridge 7, even if the operator only sets the toner cartridge 7 in the process unit 1 but forgets to lock while carrying the process unit 1, the toner cartridge 7 can be prevented from being separated from the process unit 1 while being carried. Hence, it becomes possible to prevent toner leakage or toner scattering caused by the separation of the toner cartridge 7 from the process unit 1.

At that time, with respect to the first engaging portion 58, the protrusion 66 illustrated in FIG. 33(a) applies a restraining force in an obliquely downward direction. Similarly, with respect to the second engaging portion 34, the protrusion 67 illustrated in FIG. 33(b) applies a restraining force in the downward direction. In this way, on the sides of the toner cartridge 7, the positions at which the engaging portions 58 and 34 are restrained by the protrusions 66 and 67, respectively, are set to be different positions in the circumferential direction. As a result, the toner cartridge 7 can be subjected to two types of restraining force having different directions. Hence, regardless of the orientation of the process unit 1 at the time of carrying, it can be difficult for the toner cartridge 7 to come off from the process unit 1.

During the process of preliminarily holding the toner cartridge 7, the protrusion 66 (see FIG. 29) formed on the right-hand side of the process unit 1 first passes through the low step portion 58d of the inner wall 582 of the first engaging portion 58 and then passes through the middle step portion 58e of the outer wall 581 of the first engaging portion 58. At that time, the protrusion 66 passes through the low step portion 58d without making any contact, but causes the middle step portion 58e to undergo elastic deformation and goes over the middle step portion 58e. Once the protrusion 66 goes over the middle step portion 58e that functions as an elastically deforming portion, the deformed middle step portion 58e elastically returns. That gives a click feeling to the operator who attached the toner cartridge 7. Because of the click feeling, the operator becomes able to recognize that the toner cartridge 7 has been correctly attached. Hence, it becomes possible to prevent in advance a poor attachment of the toner cartridge 7.

Meanwhile, in the present embodiment, since the low step portion 34d of the second engaging portion 34 does not come in contact with the protrusion 67 (see FIG. 12), there is no click feeling in the second engaging portion 34 even after the completion in the attachment of the toner cartridge 7. If it is desirable to have a click feeling in the second engaging portion 34 too; then a portion equivalent to the middle step portion 58e, which is formed in the first engaging portion 58, can be formed on the outer wall 341 of the second engaging portion 34.

From the preliminarily-held state described above, when the operating member 26 is rotated in the forward direction to a locked state illustrated in FIGS. 34(a) and 34(b); then, as illustrated in FIG. 36(b), the first engaging portion 58 and the second engaging portion 34 rotate in the forward direction. And the arc-like inner surfaces 62 of each of the supporting portions 54 and 33 engage with the first engaging surface 58c and the second engaging surface 34c, respectively. At that time, along with the rotation of the first engaging portion 58 and the second engaging portion 34, the protrusions 66 and 67 slide on the outer peripheries of the first engaging portion 58 and the second engaging portion 34, respectively, while pressing the first engaging portion 58 and the second engaging portion 34, respectively, downward.

On the other hand, while removing the toner cartridge 7 from the process unit 1, the operating member 26 is rotated in the reverse direction. Along with that, the first engaging portion 58 and the second engaging portion 34 rotate in the reverse direction, and return to the preliminarily-held state illustrated in FIGS. 33(a) and 33(b). When the protrusions 66 and 67 respectively reach the notches 58e and 34d of the first engaging portion 58 and the second engaging portion 34, respectively; the downward pressing force applied from the protrusions 66 and 67 disappears. As a result, the first engaging portion 58, the second engaging portion 34, and the toner cartridge 7 pop up a little bit. With that, the operator can visually confirm that the toner cartridge 7 is unlocked.

Figure 21:
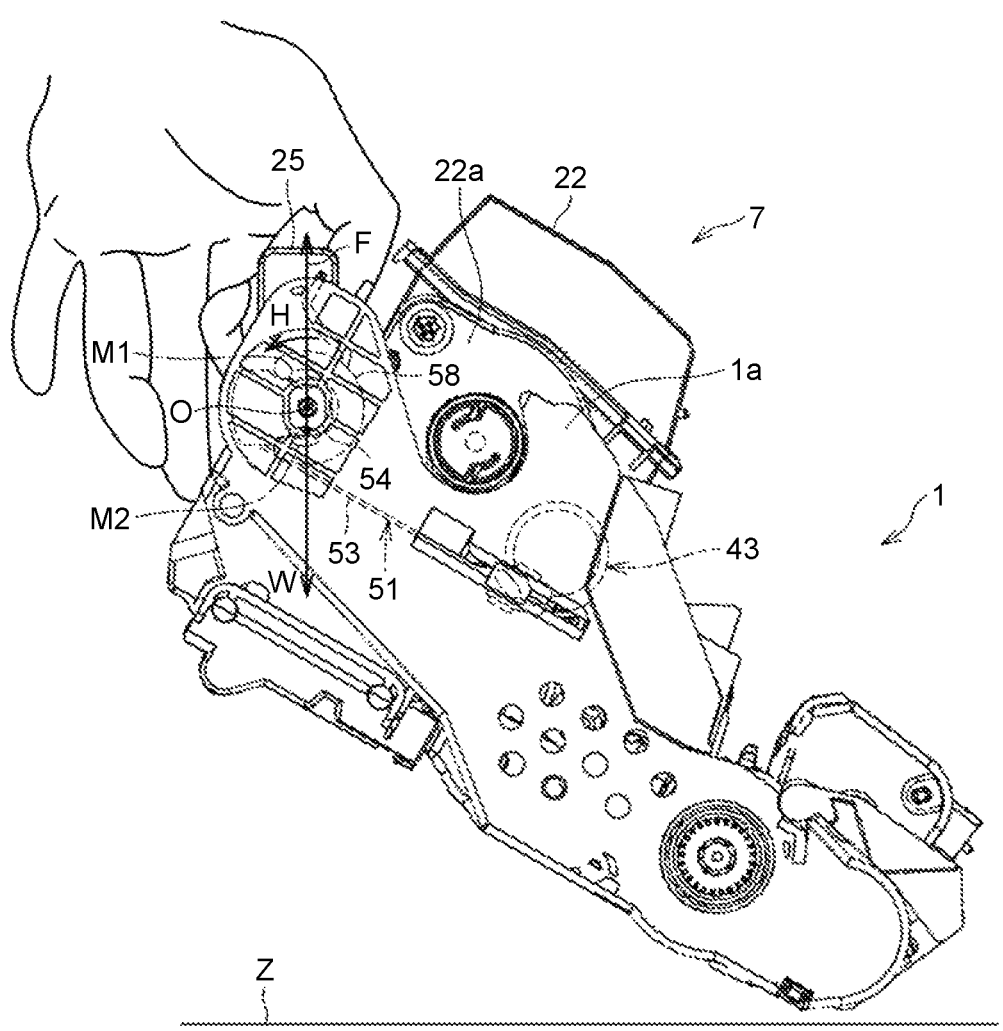
FIG. 21 is a diagram illustrating a state in which a process cartridge, which includes the toner cartridge and the process unit in an integrated manner, is lifted.

In the locked state, the toner cartridge 7 is fixed to the process unit 1. Hence, as illustrated in FIG. 21, by gripping the gripper 25, the operator can treat the toner cartridge 7 and the process unit 1 as an integrated process cartridge (for the purpose of performing operations or carrying). At that time, the process cartridge is significantly heavy because of its own weight as well as the toner filled therein. In case the locking portion 26c1 happens to receive such a weight, then the lock may get released or the locking portion 26c1 may be damaged. In that regard, in the present invention, some of the weight is received by a first engaging portion 26e and a second engaging portion 34b that respectively engage with the supporting portions 33 and 54 formed in the process unit 1. Hence, the abovementioned type of trouble does not occur.

In this locked state, as illustrated in FIG. 36(b), while being engaged with the supporting portions 33 and 54, the engaging surfaces 34c and 58c make contact at two locations with the supporting portions 33 and 54, respectively. As illustrated in FIG. 21, when the operator grips the gripper 25 and holds the process cartridge in a dangling manner, one contact location M2 out of the two contact locations is placed at the lower part of the supporting portions 33 and 54. At the contact location M2 present at the lower part, the engaging surfaces 34c and 58c can receive a weight W. That enables achieving reduction in the load on the locking portion 26c1, thereby preventing the locking portion 26c1 from getting damaged.

Moreover, as illustrated in FIG. 21, the contact location M2 that receives the weight W is located vertically beneath a center of pivoting O of the operating member 26. For that reason, not only the vector extension line of the weight W that acts on the contact location M2 passes through or close to the center of pivoting O of the operating member 26 but also the extension line of a lifting force F acting on the contact location M2 while the operator is lifting the process cartridge passes through or close to the center of pivoting O of the operating member 26. Because of the fact that the vector extension line of the weight W, which acts on the contact location M2, and the vector extension line of the lifting force F pass through or close to the center of pivoting O of the operating member 26; the weight W and the lifting force F act in different directions than a direction of pivoting H of the operating member 26 for releasing the locked state of the locking portion 26c1. As a result, when the operator lifts the process cartridge, it becomes possible to prevent a situation in which the lock is released due to the force acting on the operating member 26 at that time and thus the toner cartridge 7 and the process unit 1 are separated from each other.

Meanwhile, in the present embodiment, positioning of the toner cartridge 7 with respect to the process unit 1 is done using positioning portions at four locations. More particularly, at the time of attaching the toner cartridge 7, firstly, a pair of positioning projections 29 and 31 (see FIGS. 4 and 10), which are disposed on the far side on both sides of the toner cartridge 7, stops against a pair of guiding portions 30 and 32, respectively, (see FIG. 4). That results in positioning of the toner cartridge 7. Then, in the state in which the operating member 26 is engaged with the pivoting portion 52 of the linking member 51 and in which the engaging member 34 on the opposite side is engaged with the supporting portion 33 (see FIG. 4) of the process unit 1, the operating member 26 is pivoted in the direction of locking. As a result, the operating member 26 and the second engaging portion 34 rotate, thereby resulting in positioning with respect to the pivoting portion 52 and the supporting portion 33. In this way, in the present embodiment, the configuration is such that the toner cartridge 7 is reliably positioned with respect to the process unit 1 at four positioning locations (two positioning locations on either side). That enables achieving enhancement in the operability at the time of performing attaching/removing operations with respect to the process unit 1 and the toner cartridge 7 in an integrated fashion.

When the toner cartridge 7 is set in the process unit 1, a situation may arise in which the toner cartridge 7 is not pressed up to the specified position sufficiently due to torsion or tilt, and thus the attachment is poor. In this case, as illustrated in FIGS. 35(a) and 35(b), the protrusions 66 and 67 do not reach the outer periphery of the first engaging portion 58 and the outer periphery of the second engaging portion 34, respectively. Instead, each of the protrusions 66 and 67 dwell, for example, in between the outer wall and the inner wall on the inner diameter side than the outer periphery. In such a state of poor attachment, the engaging portions 34 and 58 do not engage properly with the supporting portions 33 and 54, respectively. More particularly, as illustrated in FIG. 37(a), a center O' of each of the supporting portions 33 and 54 misaligns the center O of each of the engaging portions 34 and 58 (i.e., the center of the shaft 35). In this state, if the operating member 26 is rotated in the forward direction; then, as illustrated in FIG. 36(b), the non-arc-like engaging surface 34c1 of each of the engaging members 35 and 58 make contact and interfere with the supporting portions 33 and 54, respectively. As a result, the non-arc-like engaging surface 34c1 functions as a rotation restricting member and restricts further rotation of the operating member 26 in the forward direction. For that reason, even if the operating member 26 is operated, the replenishment toner outlet shutter 43 does not open. Hence, it becomes possible to prevent toner leakage from occurring in the case when the operating member 26 is operated by mistake.

Consider a case in which the misalignment of the centers O and O' is only moderate. In that case, even if the rotation of the operating member 26 in the forward direction leads to the knocking of the engaging surfaces 34c and 54c against the supporting portions 33 and 54, respectively; the guiding effect of the clearance retaining portion 64a formed in each of the supporting portions 33 and 54 results in voluntary orientation correction of the engaging portions 34 and 58 in the direction of resolving the misalignment in the center core. In this case, as the operating member 26 is rotated in the forward direction without any interruption, it becomes possible to achieve the locked state. Hence, there is no need to repeat the operation of inserting the toner cartridge 7.

With that, it becomes possible to smoothly perform the task of replacing a toner cartridge.

Second Embodiment

Given below with reference to FIG. 38 to FIGS. 41(a) and 41(b) is the explanation of a second embodiment of the first engaging portion 58 and the second engaging portion 34.

Figure 38:
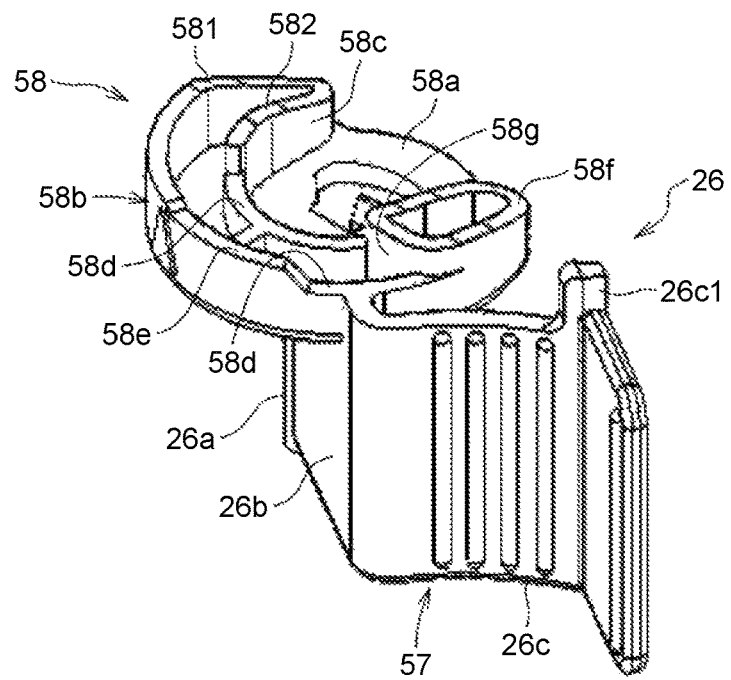
FIG. 38 is a perspective view illustrating a second embodiment of the operating member.

As illustrated in FIG. 38, in the first engaging portion 58 according to the second embodiment, a tapered surface 58g that is tilted with respect to the radial direction is formed in between the outer wall 581 and the inner wall 582. Consider the point when the operating member 26 is rotated in the forward direction to switch from the preliminarily-held state to the locked state. The tapered surface 58g has an upward tilt toward the downstream side of the relative movement direction of the protrusion 66 with respect to the first engaging portion 58 (See FIG. 40). As compared to the tapered surface 58g, the outer wall 581 is present on the upstream side in the relative movement direction of the protrusion 66; and has the low step portions 58d formed thereon. As a result, the protrusion 66 that is guided by the tapered surface 58g radially outward can smoothly move onto the outer periphery of the first engaging portion 58 via the low step portions 58d.

With such a configuration, even if the attachment of the toner cartridge 7 to the process unit 1 is poor and if the protrusion 66 dwells in between the outer wall 581 and the inner wall 582 as illustrated in FIG. 35(a); when the operating member 26 is rotated in the forward direction, the protrusion 66 follows the path illustrated by a broken line arrow in FIG. 40(a), performs a relative movement between the outer wall 581 and the inner wall 582, and is guided by the tapered surface 58g to reach the outer periphery of the first engaging portion 58. For that reason, it becomes possible to achieve the normal locked state as illustrated in FIG. 34(a). In this case too, by having the clearance retaining portion 64a in the supporting portion 54, it is possible to avoid interference between the first engaging surface 34c and the supporting portion 54 and in turn avoid restriction in the forward direction rotation of the operating member 26 caused by such interference. In this way, without repeating the operation of inserting the toner cartridge 7 replacing a toner cartridge can be performed smoothly.

Figure 39:
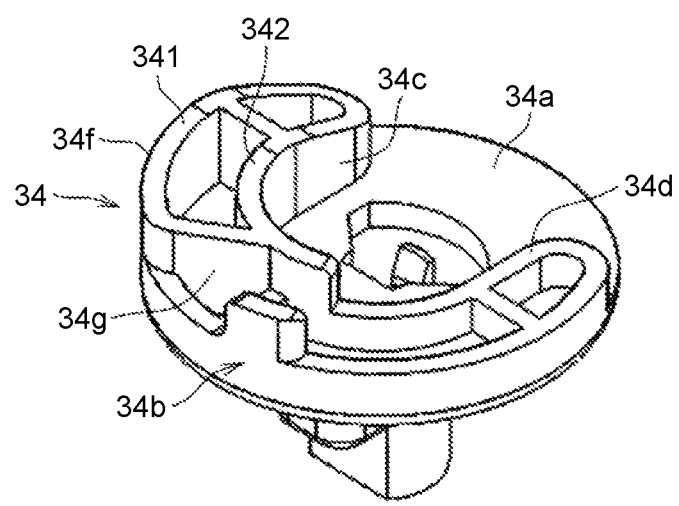
FIG. 39 is a perspective view of the second embodiment of the second engaging portion.

In FIG. 39 is illustrated the second engaging portion 34 according to the second embodiment. In the second engaging portion 34 according to the second embodiment too, a tapered surface 34g that is tilted with respect to the radial direction is formed in between the outer wall 341 and the inner wall 342. The tapered surface 34g is formed in such a way that, when the operating member 26 is rotated in the forward direction to switch from the preliminarily-held state to the locked state, the tapered surface 34g has an upward tilt toward the downstream side of the relative movement direction of the protrusion 67 with respect to the second engaging portion 34. As compared to the tapered surface 34g, the outer wall 341 is present on the upstream side in the relative movement direction of the protrusion 67; and has the low step portions 34d formed thereon. As a result, the protrusion 67 that is guided by the tapered surface 34g radially outward can smoothly move onto the outer periphery of the second engaging portion 34 via the low step portions 34d. With such a configuration, even if the attachment of the toner cartridge 7 to the process unit 1 is poor; in an identical to the case of the first engaging portion 58; when the operating member 26 is rotated in the forward direction, the protrusion 67 follows the path illustrated by a broken line arrow in FIG. 40(b).

Hence, it becomes possible to achieve the normal locked state illustrated in FIG. 34(b).

The explanation given above is for a case in which there is poor attachment of the toner cartridge 7. However, in the second embodiment, if there is no poor attachment of the toner cartridge 7 and if the attached toner cartridge 7 is preliminarily-held in a proper manner as illustrated in FIGS. 41(a) and 41(b); then it is possible to achieve a function effect identical to the function effect described in the first embodiment.

Figure 42:
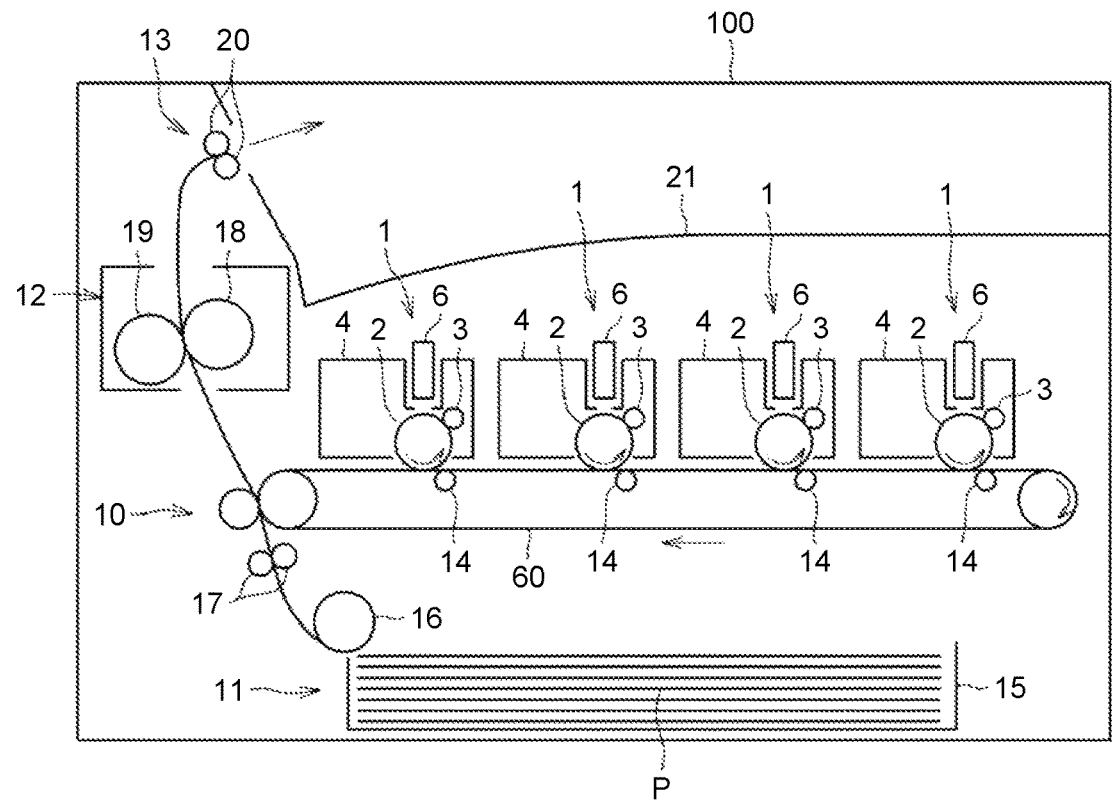
FIG. 42 is an overall configuration diagram of an indirect-transfer-type color image forming apparatus.
Figure 43:
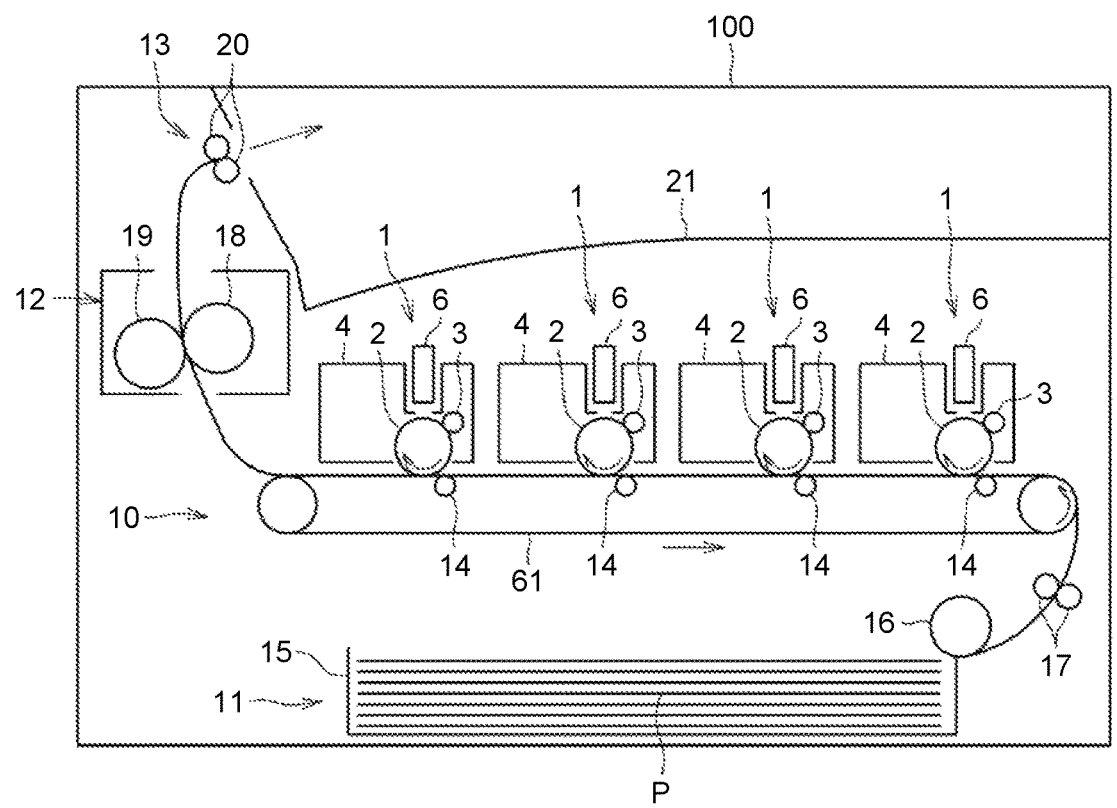
FIG. 43 is an overall configuration diagram of a direct-transfer-type color image forming apparatus.

Meanwhile, in all the embodiments of the present invention, it is assumed that a toner is used as an one-component developer, and what is called a one-component developing device is used as the developing device. However, the present invention is not limited to the embodiments described above. Alternatively, for example, it is also possible to use a two-component developing device in which a mixture of a toner and a carrier is used. Moreover, the method of replenishing the toner to the developing device is also not limited to the embodiments described above. That is, it is obvious that, within the scope of the present invention, various modifications can be done. Furthermore, the image forming apparatus to which the present invention can be applied is not limited to the monochromatic image forming apparatus illustrated in FIG. 1. Alternatively, the present invention can also be applied to the following types of image forming apparatuses: an indirect-transfer-type color image forming apparatus illustrated in FIG. 42 in which images formed on a plurality of photosensitive members 2 are indirectly transferred onto a paper sheet via an intermediate transfer belt (an intermediate transfer member) 60; and a direct-transfer-type color image forming apparatus illustrated in FIG. 43 in which images formed on a plurality of photosensitive members 2 are directly transferred onto a paper sheet that is conveyed by a conveying belt (a conveying member) 61. Besides, examples of the image forming apparatuses to which the present invention can be applied also include a printer, a copying machine, a facsimileing machine, or a multifunction product having those functions.

The present invention also includes the following aspects:

Aspect 1

A toner container that is detachably attachable to a developing device, the developing device comprising:

an inlet to be poured a toner;

an inlet shutter to move between a closing position, at which the inlet is closed, and an opening position, at which the inlet is open;

a biasing member to bias the inlet shutter toward the closing position;

an engaged portion provided in the inlet shutter;

an engaging portion to engage with the engaged portion and to retain the inlet shutter at the opening position against a biasing force of the biasing member; and an engagement releasing portion provided in the inlet shutter and to release an engaging state between the engaged portion and the engaging portion; and the toner container comprising:

a contacting surface to contact with the engagement releasing portion and to make the engagement releasing portion release the engaging state.

Aspect 2

The toner container according to aspect 1, further comprising a pressing surface to contact a pressed portion provided in the inlet shutter, and to move the shutter to the opening position against a biasing force of the biasing member.

Aspect 3

The toner container according to aspect 1 or 2, wherein
the developing device including an extending portion that extends from the shutter body of the inlet shutter, the extending portion including the engaged portion provided at an end thereof and the engagement releasing portion provided in an in-between portion thereof; and the toner container including the contacting surface to contact with the engagement releasing portion so that the extending portion is elastically deformed and an engaging state between the engaged portion and the engaging portion is released.

Aspect 4

The toner container according to aspect 2 or 3, wherein
a mounting direction with respect to the developing device is different than a direction of movement of the inlet shutter toward the opening position, the pressed portion in the developing device is a tilted surface that is tilted facing a direction opposite to the mounting direction as well as a direction opposite to a direction of movement toward the opening position, and due to contacting with the tilted surface, the pressing surface generates a force to move the inlet shutter to the opening position against the biasing force of the biasing member.

Aspect 5

The toner container according to any one of aspects 1 to 4, wherein, when the inlet shutter moves to the opening position, the contacting surface and the engagement releasing portion do not contact.

Aspect 6

A developing device to which the toner container according to any one of aspects 1 to 5 can be detachably attached, the developing device comprising:
the inlet;
the inlet shutter;
the biasing member;
the engaged portion;
the engaging portion; and
the engagement releasing portion.

Aspect 7

The developing device according to aspect 6, wherein the engaging portion is provided on a casing of the developing device.

Aspect 8

A process cartridge comprising:
a process unit including at least an image carrier and the developing device according to aspect 6 or 7, which develop an image on the image carrier with toner, and being detachably attachable to an image forming apparatus; and
the toner container according to any one of aspects 1 to 5 that is attached to the developing device of the process unit.

Aspect 9

An image forming apparatus comprising the toner container according to any one of aspects 1 to 5.

Aspect 10

A toner container comprising:
a container body to contain a toner and that is attachable to and detachable from a developing device;
an outlet to discharge the toner contained in the container body;
an outlet shutter to open and close the outlet; and
an operating member to move the shutter according a direction of rotation thereof, the operating member being attached in a rotatable manner to the container body and that, wherein the operating member includes an engaging portion that is rotatable in conjunction with rotation of the operating member and that is rotatably supported by engagement with a supporting portion provided in the developing device.

Aspect 11

The toner container according to aspect 10, wherein the engaging portion includes a rotation restricting portion that, in a state in which the engaging portion and the supporting portion are engaged in a poor manner, interferes with the supporting portion and restricts rotation of the engaging portion.

Aspect 12

The toner container according to aspect 11, wherein the engaging portion includes a curved engaging surface, which engages with the supporting portion, and a flat engaging surface, which extends in at least one side in a circumferential direction of the curved engaging surface and which constitutes the rotation restricting portion.

Aspect 13

The toner container according to aspect 10, wherein the engaging portion includes an elastically deforming portion that, while the container body is being attached to the developing device, contacts with a protrusion provided in the developing device and undergoes elastic deformation, and then elastically returns after crossing the protrusion.

Aspect 14

The toner container according to aspect 13, wherein the protrusion that has crossed the elastically deforming portion restrains the engaging portion.

Aspect 15

The toner container according to aspect 13, wherein the engaging portion includes a guiding surface that, along with rotation of the engaging portion, guides the protrusion radially outward.

Aspect 16

A process cartridge comprising:
a process unit including a developing device that includes the supporting portion and that is detachably attachable to an image-forming-apparatus main body; and
the toner container according to any one of aspects 10 to 15 that is detachably attachable to the process unit.

Aspect 17

The process cartridge according to aspect 16, wherein an outer periphery of the supporting portion includes a pair of cylindrical surfaces opposite to each other in a radial direction and includes a connecting surface that connects the opposite cylindrical surfaces in an inside of an imaginary circle having same radius as the cylindrical surfaces.

Aspect 18

The process cartridge according to aspect 17, further comprising an image carrier, on a surface of which a latent image is formed, wherein
a toner is supplied from the developing device onto the image carrier.

Aspect 19

An image forming apparatus comprising:
the process cartridge according to aspect 18; and
an image-forming apparatus main body.

Aspect 20

The toner container according to any one of aspects 1 to 5, 10 to 15, wherein the toner container contains a toner.

Aspect 21

The toner container according to aspect 20, wherein the toner contained in the toner container is a mixture of a toner and a carrier.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A process unit, comprising:
   a toner container to contain toner;
   a mounting portion to which the toner container is mounted;
   a gripper disposed on a side in an attaching direction of the toner container, the side being at an upstream position relative to the attaching direction of the toner container; and
   a linking member including a convex portion,
   the toner container includes:
   a locking portion, to switch between a locked state, in which the locking portion engages with a mounting-portion-side engaging portion at the mounting portion, and an unlocked state, in which the locked state is released; and
   an engaging portion, in a state in which the toner container is attached to the process unit, to engage with the convex portion of the linking member, and in a state in which the engaging portion engages with the convex portion when the process unit that is held by gripping the gripper, a contact location of the engaging portion and the convex portion is positioned at a lower part of the convex portion.

2. The process unit according to claim 1, wherein, in a state in which the engaging portion engages with the convex portion and an operating member is pivoted to switch the locking portion to the locked state, when the process unit that is integrated with the toner container is held by gripping the gripper, the contact location of the engaging portion and the convex portion is locatable vertically beneath the center of pivoting of the operating member.

3. The process unit according to claim 1, wherein:
   the container body includes a conveying member, which conveys toner internal to the container body to an outlet, and a drive transmission unit, which transmits a driving force to the conveying member, and
   the linking member and the drive transmission unit are disposed at a same side of the process unit.

4. The process unit according to claim 1, wherein:
   the toner container is detachably attachable to the process unit which further includes an image carrier and a developing device, which develops an image on the image carrier with toner, and
   when the toner container is attached to the process unit, the process unit and the toner container are carriable as a process cartridge, into which the process unit and the toner container are integrated, by gripping the gripper.

5. The process unit according to claim 4, wherein the gripper is pivotable with respect to the toner container.

6. The process unit according to claim 1, wherein the toner container includes therein toner.

7. The process unit according to claim 6, wherein the toner is a mixture of toner and carrier.

8. The process unit according to claim 1, wherein the processing unit further comprises:
   a developer to develop a latent image using the toner from the toner container.

9. A process unit, comprising:
   a toner container to contain toner;
   a mounting section to which the toner container is mounted;
   a gripper disposed on a side in an attaching direction of the toner container, the side being at an upstream position relative to the attaching direction of the toner container; and
   a link including a convex part;
   the toner container includes;
   a lock, to switch between a locked state, in which the lock engages with a mounting-section-side engaging section in the mounting section, and an unlocked state, in which the locked state is released; and
   a connector, in a state in which the toner container is attached to the process unit, to engage with the convex part of the link, and in a state in which the connector engages with the convex part when the process unit that is held by gripping the gripper, a contact location of the connector and the convex part is positioned at a lower part of the convex part.

10. The process unit according to claim 9, wherein, in a state in which the connector engages with the convex part and an operator is pivoted to switch the lock to the locked state, when the process unit that is integrated with the toner container is held by gripping the gripper, a contact location of the connector and the convex part is locatable vertically beneath the center of pivoting of the operator.

11. The process unit according to claim 9, wherein:
    the container body includes a conveyor, which conveys toner internal to the container body to an outlet, and a drive transmitter, which transmits a driving force to the conveyor, and
    the link and the drive transmitter are disposed at a same side of the process unit.

12. The process unit according to claim 9, wherein:
    the toner container is detachably attachable to the process unit which further includes an image carrier and a developing device, which develops an image on the image carrier with toner, and
    when the toner container is attached to the process unit, the process unit and the toner container are carriable as a process cartridge, into which the process unit and the toner container are integrated, by gripping the gripper.

13. The process unit according to claim 12, wherein the gripper is pivotable with respect to the toner container.

14. The process unit according to claim 9, wherein the toner container includes therein toner.

15. The process unit according to claim 14, wherein the toner is a mixture of toner and carrier.

16. The process unit according to claim 9, wherein the processing unit further comprises:
    a developer to develop a latent image using the toner from the toner container.

* * * * *